United States Patent
Richert et al.

(10) Patent No.: US 9,939,253 B2
(45) Date of Patent: Apr. 10, 2018

(54) APPARATUS AND METHODS FOR DISTANCE ESTIMATION USING MULTIPLE IMAGE SENSORS

(71) Applicant: Brain Corporation, San Diego, CA (US)

(72) Inventors: Micah Richert, San Diego, CA (US); Marius Buibas, San Diego, CA (US); Vadim Polonichko, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 621 days.

(21) Appl. No.: 14/285,414

(22) Filed: May 22, 2014

(65) Prior Publication Data

US 2015/0338204 A1  Nov. 26, 2015

(51) Int. Cl.
*G01B 11/14* (2006.01)
*H04N 19/51* (2014.01)
*G06T 7/593* (2017.01)

(52) U.S. Cl.
CPC .............. *G01B 11/14* (2013.01); *G06T 7/593* (2017.01); *G06T 2207/10021* (2013.01); *G06T 2207/30196* (2013.01); *G06T 2207/30252* (2013.01); *H04N 19/51* (2014.11)

(58) Field of Classification Search
None
See application file for complete search history.

(56) References Cited

U.S. PATENT DOCUMENTS

| | | | |
|---|---|---|---|
| 5,063,603 A | 11/1991 | Burt |
| 5,138,447 A | 8/1992 | Shen et al. |
| 5,216,752 A | 6/1993 | Tam |
| 5,272,535 A | 12/1993 | Elabd |
| 5,355,435 A | 10/1994 | Deyong et al. |
| 5,638,359 A | 6/1997 | Peltola et al. |

(Continued)

FOREIGN PATENT DOCUMENTS

| | | |
|---|---|---|
| CN | 102226740 A | 10/2011 |
| JP | H0487423 A | 3/1992 |

(Continued)

OTHER PUBLICATIONS

Berkes, et al., Slow feature analysis yields a rich repertoire of complex cell properties. Journal of Vision (2005) vol. 5 (6).

(Continued)

*Primary Examiner* — Mohammad J Rahman
(74) *Attorney, Agent, or Firm* — Gazdzinski & Associates, PC

(57) ABSTRACT

Data streams from multiple image sensors may be combined in order to form, for example, an interleaved video stream, which can be used to determine distance to an object. The video stream may be encoded using a motion estimation encoder. Output of the video encoder may be processed (e.g., parsed) in order to extract motion information present in the encoded video. The motion information may be utilized in order to determine a depth of visual scene, such as by using binocular disparity between two or more images by an adaptive controller in order to detect one or more objects salient to a given task. In one variant, depth information is utilized during control and operation of mobile robotic devices.

23 Claims, 15 Drawing Sheets

(56) References Cited

U.S. PATENT DOCUMENTS

| | | |
|---|---|---|
| 5,673,367 A | 9/1997 | Buckley |
| 5,875,108 A | 2/1999 | Hoffberg et al. |
| 6,009,418 A | 12/1999 | Cooper |
| 6,014,653 A | 1/2000 | Thaler |
| 6,035,389 A | 3/2000 | Grochowski et al. |
| 6,359,601 B1 | 3/2002 | Maguire, Jr. |
| 6,418,424 B1 | 7/2002 | Hoffberg et al. |
| 6,458,157 B1 | 10/2002 | Suaning |
| 6,501,515 B1 | 12/2002 | Iwamura |
| 6,501,794 B1 | 12/2002 | Wang et al. |
| 6,509,854 B1 | 1/2003 | Morita et al. |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,556,610 B1 | 4/2003 | Jiang et al. |
| 6,581,046 B1 | 6/2003 | Ahissar |
| 6,625,317 B1 | 9/2003 | Gaffin et al. |
| 6,678,590 B1 * | 1/2004 | Burchfiel ............ G05D 1/0253 348/116 |
| 7,016,783 B2 | 3/2006 | Hac et al. |
| 7,113,867 B1 | 9/2006 | Stein |
| 7,142,602 B2 | 11/2006 | Porikli et al. |
| 7,430,682 B2 * | 9/2008 | Carlson ............... G06K 7/10722 348/584 |
| 7,447,337 B2 | 11/2008 | Zhang et al. |
| 7,580,907 B1 | 8/2009 | Rhodes |
| 7,653,255 B2 | 1/2010 | Rastogi |
| 7,737,933 B2 | 6/2010 | Yamano et al. |
| 7,809,197 B2 | 10/2010 | Fedorovskaya et al. |
| 7,849,030 B2 | 12/2010 | Ellingsworth |
| 8,000,967 B2 | 8/2011 | Taleb |
| 8,015,130 B2 | 9/2011 | Matsugu et al. |
| 8,103,602 B2 | 1/2012 | Izhikevich |
| 8,108,147 B1 | 1/2012 | Blackburn |
| 8,160,354 B2 | 4/2012 | Paquier |
| 8,200,593 B2 | 6/2012 | Guillen et al. |
| 8,311,965 B2 | 11/2012 | Breitwisch et al. |
| 8,315,305 B2 | 11/2012 | Petre et al. |
| 8,390,707 B2 | 3/2013 | Yamashita |
| 8,396,249 B1 | 3/2013 | Khosla et al. |
| 8,396,282 B1 | 3/2013 | Huber et al. |
| 8,416,847 B2 | 4/2013 | Roman |
| 8,467,623 B2 | 6/2013 | Izhikevich et al. |
| 8,542,875 B2 | 9/2013 | Eswara |
| 8,712,939 B2 | 4/2014 | Szatmary et al. |
| 9,070,285 B1 | 6/2015 | Ramu et al. |
| 9,150,220 B2 | 10/2015 | Clarke et al. |
| 9,713,982 B2 * | 7/2017 | Buibas ................. B64D 47/08 |
| 2002/0038294 A1 | 3/2002 | Matsugu |
| 2002/0176025 A1 | 11/2002 | Kim et al. |
| 2003/0050903 A1 | 3/2003 | Liaw et al. |
| 2003/0216919 A1 | 11/2003 | Roushar |
| 2004/0054964 A1 | 3/2004 | Bozdagi et al. |
| 2004/0136439 A1 | 7/2004 | Dewberry et al. |
| 2004/0170330 A1 | 9/2004 | Fogg et al. |
| 2004/0193670 A1 | 9/2004 | Langan et al. |
| 2004/0233987 A1 | 11/2004 | Porikli et al. |
| 2005/0015351 A1 | 1/2005 | Nugent |
| 2005/0036649 A1 | 2/2005 | Yokono et al. |
| 2005/0047647 A1 | 3/2005 | Rutishauser et al. |
| 2005/0062846 A1 | 3/2005 | Choi et al. |
| 2005/0096539 A1 | 5/2005 | Leibig et al. |
| 2005/0283450 A1 | 12/2005 | Matsugu et al. |
| 2006/0008144 A1 | 1/2006 | Prasad et al. |
| 2006/0088191 A1 | 4/2006 | Zhang et al. |
| 2006/0094001 A1 | 5/2006 | Torre et al. |
| 2006/0127042 A1 * | 6/2006 | Park ..................... G11B 27/105 386/337 |
| 2006/0129728 A1 | 6/2006 | Hampel |
| 2006/0161218 A1 | 7/2006 | Danilov |
| 2006/0188168 A1 | 8/2006 | Sheraizin et al. |
| 2006/0285724 A1 | 12/2006 | Tian |
| 2007/0003130 A1 | 1/2007 | Goerick et al. |
| 2007/0022068 A1 | 1/2007 | Linsker |
| 2007/0071100 A1 | 3/2007 | Shi et al. |
| 2007/0109409 A1 | 5/2007 | Yea et al. |
| 2007/0176643 A1 | 8/2007 | Nugent |
| 2007/0208678 A1 | 9/2007 | Matsugu |
| 2008/0043848 A1 | 2/2008 | Kuhn |
| 2008/0100482 A1 | 5/2008 | Lazar |
| 2008/0152236 A1 | 6/2008 | Vendrig et al. |
| 2008/0174700 A1 | 7/2008 | Takaba |
| 2008/0199072 A1 | 8/2008 | Kondo et al. |
| 2008/0205764 A1 | 8/2008 | Iwai et al. |
| 2008/0237446 A1 | 10/2008 | Oshikubo et al. |
| 2008/0252723 A1 | 10/2008 | Park |
| 2008/0267458 A1 | 10/2008 | Laganiere et al. |
| 2009/0018696 A1 | 1/2009 | Goerick et al. |
| 2009/0028384 A1 | 1/2009 | Bovyrin et al. |
| 2009/0043722 A1 | 2/2009 | Nugent |
| 2009/0096863 A1 * | 4/2009 | Kim ................... G06K 9/00604 348/42 |
| 2009/0096927 A1 | 4/2009 | Camp, Jr. et al. |
| 2009/0106030 A1 | 4/2009 | Den Brinker et al. |
| 2009/0141938 A1 | 6/2009 | Lim et al. |
| 2009/0195640 A1 * | 8/2009 | Kim ................... H04N 13/004 348/43 |
| 2009/0202114 A1 | 8/2009 | Morin et al. |
| 2009/0287624 A1 | 11/2009 | Rouat et al. |
| 2009/0304231 A1 | 12/2009 | Lu et al. |
| 2009/0312985 A1 | 12/2009 | Eliazar |
| 2009/0323809 A1 | 12/2009 | Raveendran |
| 2010/0036457 A1 | 2/2010 | Sarpeshkar et al. |
| 2010/0073371 A1 * | 3/2010 | Ernst ..................... G09G 5/393 345/428 |
| 2010/0080297 A1 | 4/2010 | Wang et al. |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar et al. |
| 2010/0235310 A1 | 9/2010 | Gage et al. |
| 2010/0271511 A1 * | 10/2010 | Ma ........................ G06T 7/0065 348/239 |
| 2010/0290530 A1 | 11/2010 | Huang et al. |
| 2010/0299296 A1 | 11/2010 | Modha et al. |
| 2011/0002191 A1 | 1/2011 | Demaio et al. |
| 2011/0016071 A1 | 1/2011 | Guillen et al. |
| 2011/0063409 A1 * | 3/2011 | Hannuksela ......... H04N 19/597 348/42 |
| 2011/0103480 A1 | 5/2011 | Dane |
| 2011/0119214 A1 | 5/2011 | Breitwisch et al. |
| 2011/0119215 A1 | 5/2011 | Elmegreen et al. |
| 2011/0134242 A1 | 6/2011 | Loubser et al. |
| 2011/0137843 A1 | 6/2011 | Poon et al. |
| 2011/0160741 A1 | 6/2011 | Asano et al. |
| 2011/0170792 A1 | 7/2011 | Tourapis et al. |
| 2011/0206122 A1 | 8/2011 | Lu et al. |
| 2011/0222603 A1 | 9/2011 | Le Barz et al. |
| 2011/0228092 A1 | 9/2011 | Park |
| 2011/0242341 A1 * | 10/2011 | Agrawal ............... G06T 3/4007 348/218.1 |
| 2011/0280300 A1 * | 11/2011 | Tourapis ............ H04N 13/0048 375/240.2 |
| 2012/0011090 A1 | 1/2012 | Tang et al. |
| 2012/0026304 A1 * | 2/2012 | Kawahara .......... H04N 13/0438 348/55 |
| 2012/0057634 A1 | 3/2012 | Shi et al. |
| 2012/0072189 A1 | 3/2012 | Bullen et al. |
| 2012/0083982 A1 | 4/2012 | Bonefas et al. |
| 2012/0084240 A1 | 4/2012 | Esser et al. |
| 2012/0093402 A1 | 4/2012 | Staelin et al. |
| 2012/0109866 A1 | 5/2012 | Modha |
| 2012/0130566 A1 | 5/2012 | Anderson et al. |
| 2012/0140032 A1 * | 6/2012 | Tabor .................. G02B 27/2264 348/43 |
| 2012/0162450 A1 | 6/2012 | Park et al. |
| 2012/0212579 A1 * | 8/2012 | Frojdh ................. H04N 19/597 348/43 |
| 2012/0230580 A1 * | 9/2012 | Knee ................... H04N 13/0003 382/154 |
| 2012/0236114 A1 * | 9/2012 | Chang ..................... G06T 7/50 348/43 |

(56) References Cited

U.S. PATENT DOCUMENTS

| | | |
|---|---|---|
| 2012/0243733 A1 | 9/2012 | Sawai |
| 2012/0256941 A1 | 10/2012 | Ballestad et al. |
| 2012/0294486 A1 | 11/2012 | Diggins et al. |
| 2012/0294546 A1 | 11/2012 | Sakamoto et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330447 A1 | 12/2012 | Gerlach et al. |
| 2013/0019024 A1 | 1/2013 | Sheth et al. |
| 2013/0022111 A1* | 1/2013 | Chen ............. H04N 19/50 375/240.12 |
| 2013/0050574 A1 | 2/2013 | Lu et al. |
| 2013/0051680 A1 | 2/2013 | Kono et al. |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0147915 A1* | 6/2013 | Wiegand ............ H04N 13/0048 348/43 |
| 2013/0148882 A1 | 6/2013 | Lee |
| 2013/0151450 A1 | 6/2013 | Ponulak |
| 2013/0176430 A1 | 7/2013 | Zhu et al. |
| 2013/0218821 A1 | 8/2013 | Szatmary et al. |
| 2013/0222534 A1 | 8/2013 | Rusanovskyy et al. |
| 2013/0226532 A1 | 8/2013 | Ben Himane et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325777 A1 | 12/2013 | Petre et al. |
| 2013/0343610 A1* | 12/2013 | Dal Mutto ......... G06K 9/00355 382/103 |
| 2014/0003711 A1 | 1/2014 | Ngan et al. |
| 2014/0012788 A1 | 1/2014 | Piekniewski |
| 2014/0016858 A1 | 1/2014 | Richert |
| 2014/0028793 A1* | 1/2014 | Wiegand ............ H04N 13/0011 348/42 |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0085507 A1 | 3/2014 | Pillman et al. |
| 2014/0086486 A1 | 3/2014 | Pillman et al. |
| 2014/0119654 A1 | 5/2014 | Taylor et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0124004 A1 | 5/2014 | Rosenstein et al. |
| 2014/0156574 A1 | 6/2014 | Piekniewski et al. |
| 2014/0201126 A1 | 7/2014 | Zadeh et al. |
| 2014/0241612 A1 | 8/2014 | Rhemann et al. |
| 2014/0328405 A1* | 11/2014 | Shen ................. H04N 13/0048 375/240.16 |
| 2014/0379179 A1 | 12/2014 | Goossen et al. |
| 2015/0077639 A1 | 3/2015 | Chamaret et al. |
| 2015/0127154 A1 | 5/2015 | Passot et al. |
| 2015/0127155 A1 | 5/2015 | Passot et al. |
| 2015/0181168 A1 | 6/2015 | Pahalawatta et al. |
| 2015/0217449 A1 | 8/2015 | Meier et al. |
| 2015/0269439 A1 | 9/2015 | Versace et al. |
| 2015/0281715 A1 | 10/2015 | Lawrence et al. |
| 2015/0304634 A1 | 10/2015 | Karvounis |
| 2015/0304640 A1* | 10/2015 | Brooks .............. H04N 13/0011 348/56 |
| 2015/0312547 A1* | 10/2015 | Cucca ................ H04N 19/597 348/43 |
| 2016/0003946 A1 | 1/2016 | Gilliland et al. |
| 2016/0007043 A1 | 1/2016 | Heo et al. |
| 2016/0009413 A1 | 1/2016 | Lee et al. |
| 2016/0165209 A1 | 6/2016 | Huang et al. |
| 2016/0182884 A1 | 6/2016 | Lin et al. |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' Plos Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Florian (2003), Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <url:http: download?doi="10.1.1.216.4931-"&rep1&type="pdf"></url:http:>.

Foldiak, P. Learning invariance from transformation sequences. Neural Computation, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. 1-15. 2(4): 1430, doi: 1 0.4249/scholarpedia.1430.

(56) References Cited

OTHER PUBLICATIONS

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 23, 2012]. Retrieved from the Internet:<URL:http:// www. google.coinlurl ?sa—t&rct—j&q—Giuck+ 4)/022STIMULUS+ GENERALIZATION+AND+REPRESENTATION N+1N+ ADAPTIVE+NETWORK+MODELS±0F+CATEGORY+LEARN I NG%22+ 1991.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.
Hopfield JJ (1995) Pattern recognition computation using action potential timing for stimulus representation.Nature 376: 33-36.
Izhikevich E.M. (2004) Which Model to Use for Cortical Spiking Neurons? IEEE Transactions on Neural Networks, 15:1063-1070.
Izhikevich E.M. (2006) Polychronization: Computation With Spikes. Neural Computation, 18:245-282.
Izhikevich, E,M. (2007) Dynamical Systems in Neuroscience: The Geometry of Excitability and Bursting, The MIT Press, 2007.
Izhikevich, E.M, et al. (2009), Polychronous Wavefront Computations. International Journal of Bifurcation and Chaos, 19:1733-1739.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Janowitz, M.K., et al., Excitability changes that complement Hebbian learning. Network, Computation in Neural Systems, 2006, 17 (1), 31-41.
Karbowski et al., 'Multispikes and Synchronization in a Large Neural Network with Temporal Delays', Neural Computation 12. 1573-1606 (2000).
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.
Knoblauch, et al., Memory Capacities for Synaptic and Structural Plasticity, Neural Computation 2009, pp. 1-45.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/ nnql/issues/detail?id=1>.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar et al. 'Consistent recovery of sensory stimuli encoded with MIMO neural circuits.' Computational intelligence and neuroscience (2010): 2.
Masquelier, et al., Learning to recognize objects using waves of spikes and Spike Timing-Dependent Plasticity. Neural Networks (IJCNN), The 2010 International Joint Conference on DOI-10.1109/1JCNN.2010.5596934 (2010) pp. 1-8.
Masquelier, Timothee, 'Relative spike time coding and Stop-based orientation selectivity in the early visual system in natural continuous and saccadic vision: a computational model.' Journal of computational neuroscience 32.3 (2012): 425-441.
Meister, M.; Berry, M.J. The neural code of the retina, Neuron, 1999, 22, 435-450.
Meister, M, Multineuronal codes in retinal signaling. Proceedings of the National Academy of sciences. 1996, 93, 609-614.
Nichols, A Reconfigurable Computing Architecture for Implementing Artificial Neural Networks on FPGA, Master's Thesis, The University of Guelph, 2003, pp. 1-235.
Oster, M., et al., A Spike-Based Saccadic Recognition System, ISCAS 2007. IEEE International Symposium on Circuits and Systems, 2009, pp, 3083-3086.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 21, 2005 [online] [Retrieved on Dec. 10, 2013] Retrieved from the Internet <URL: http://citeseerx.ist.psu.edu! viewdoc/download?doi=0.1.1.5.4346&rep—repl&type-pdf.
Rekeczky, et al., "Cellular Multiadaptive Analogic Architecture: A Computational Framework for UAV Applications." May 2004.
Revow, M., et al., 1996, Using Generative Models for Handwritten Digit Recognition, IEEE Trans. on Pattern Analysis and Machine Intelligence, 18, No. 6, Jun. 1996.
Sanchez, Efficient Simulation Scheme for Spiking Neural Networks. Doctoral Thesis. (Juiversita di Granada Mar. 28, 2008, pp. 1-104.
Sato et al., 'Pulse interval and width modulation for video transmission.' Cable Television, IEEE Transactions on 4 (1978): 165-173.
Schemmel, J., et al., Implementing synaptic plasticity in a VLSI spiking neural network model. In: Proceedings of the 2006International Joint Conference on Neural Networks (IJCNN'06), IEEE Press (2006) Jul. 16-21, 2006, pp. 1-6 [online], [retrieved on Aug. 24, 2012]. Retrieved from the Internet <url: Introduction<lt/url:>.
Schnitzer, M.J., et al., Multineuronal Firing Patterns in the Signal from Eye to Brain. Neuron, 2003, 37, 499-511.
Serrano-Gotarredona, et al, "On Real-Time: AER 2-D Convolutions Hardware for Neuromorphic Spike-based Cortical Processing", Jul. 2008.
Simulink.RTM. model [online], [Retrieved on Dec. 10, 2013] Retrieved from <It:URL:http://www.mathworks.com/ products/ simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10. 1371%2Fjournal,pcbi.1000879<url:><It;/url:>.
Thomas, S., et al, (2004), Realistic Modeling of Simple and Complex Cell Tuning in the HMAX Model, and Implications for Invariant Object Recognition in Cortex, Al Memo 2004-017 Jul. 2004.
Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

(56) References Cited

OTHER PUBLICATIONS

Thorpe, S.J., et al. (2001), Spike-based strategies for rapid processing. Neural Networks 14, pp. 715-725.
Thorpe, S.J., et al. (2004), SpikeNet: real-time visual processing with one spike per neuron, Neurocomputing, 58-60, pp. 857-864.
Van Rullen, et al. (2003), Is perception discrete or continuous? Trends in Cognitive Sciences 7(5), pp. 207-213.
Van Rullen, R., et al (2005), Spike times make sense. Trends in Neurosciences 28(1).
Van Rullen R., et al., Rate Coding versus temporal order coding: What the Retinal ganglion cells tell the visual cortex. Neural computation, 2001, 13, 1255-1283.
Wallis, G., et al., A model of invariant object recognition in the visual system, Progress in Neurobiology. 1997, 51, 167-194.
Wang 'The time dimension for scene analysis.' Neural Networks, IEEE Transactions on 16.6 (2005): 1401-1426.
Wiskott, L., et al., Slow feature analysis: Unsupervised learning of invariances, Neural Computation, 2002, 14, (4), 715-770.
Wysoski et al, "Fast and Adaptive Network of Spiking Neuron for Multi-view Visual Pattern Recognition", May 3, 2008, Elsevier,Neurocomputing vol. 71, pp. 2563-2575.
Zarandy, et al., "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738<http:login.jsp?tp="&amumber=1438738&url=http%3A%2F%2Fiee"></http:>.

\* cited by examiner

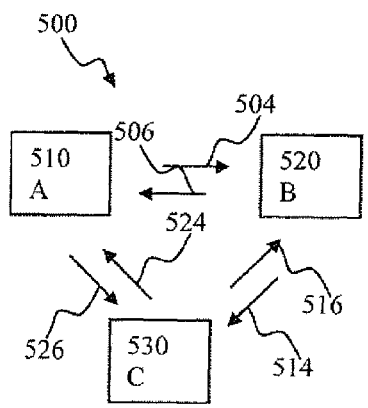
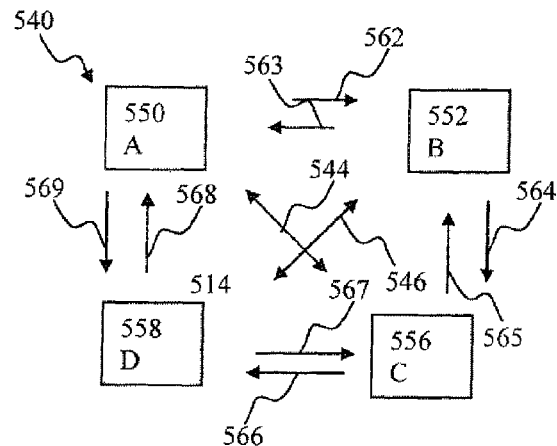
FIG. 5A    FIG. 5B
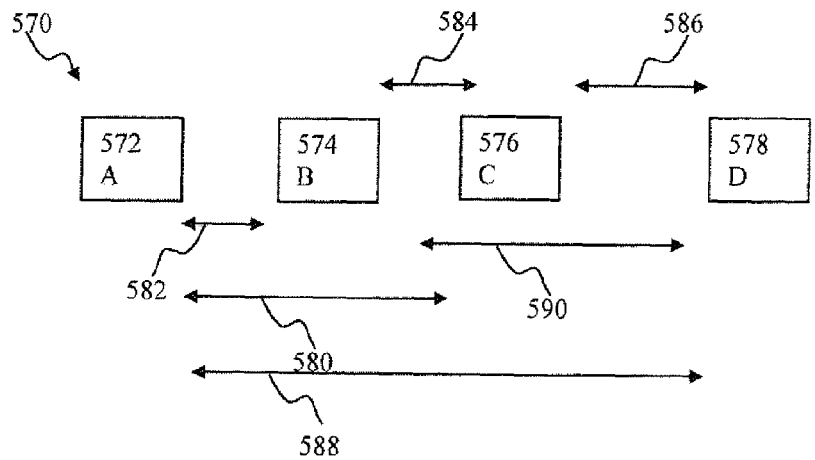
FIG. 5C

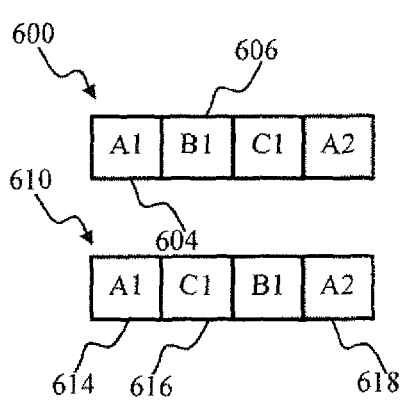
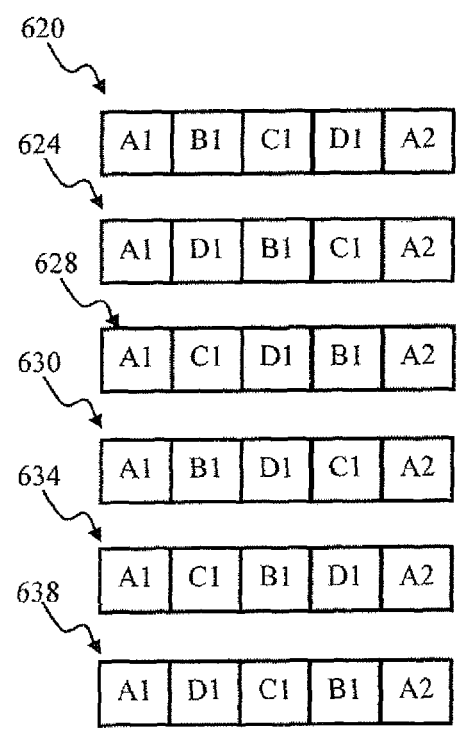
FIG. 6A
FIG. 6B

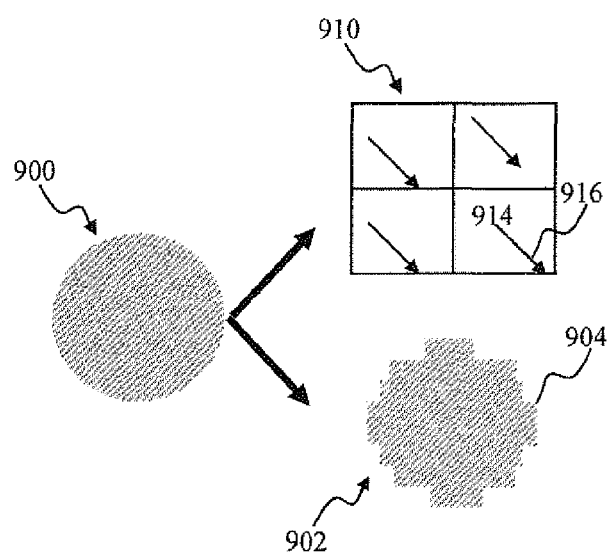
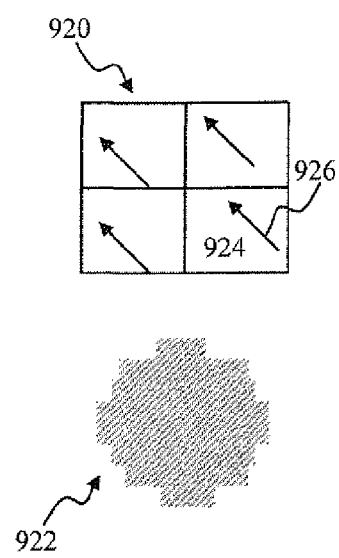
FIG. 9A  FIG. 9B
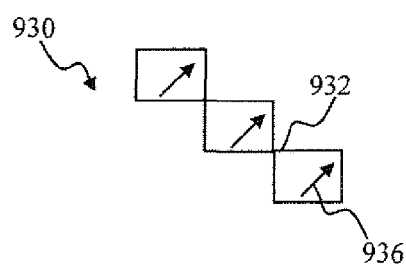
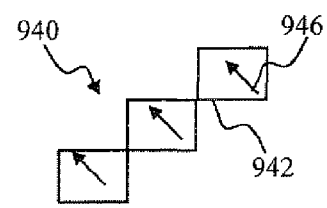
FIG. 9C

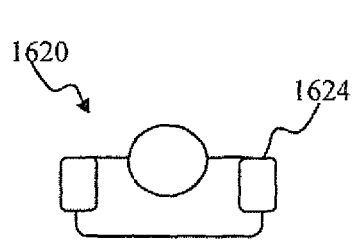
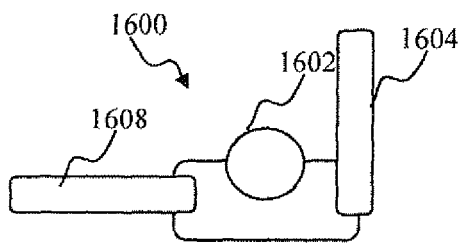
FIG. 16A  FIG. 16B
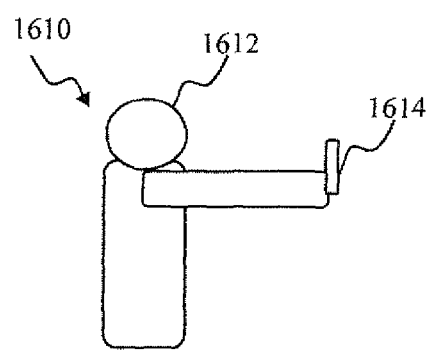
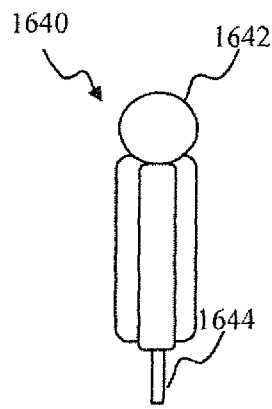
FIG. 16C  FIG. 16D
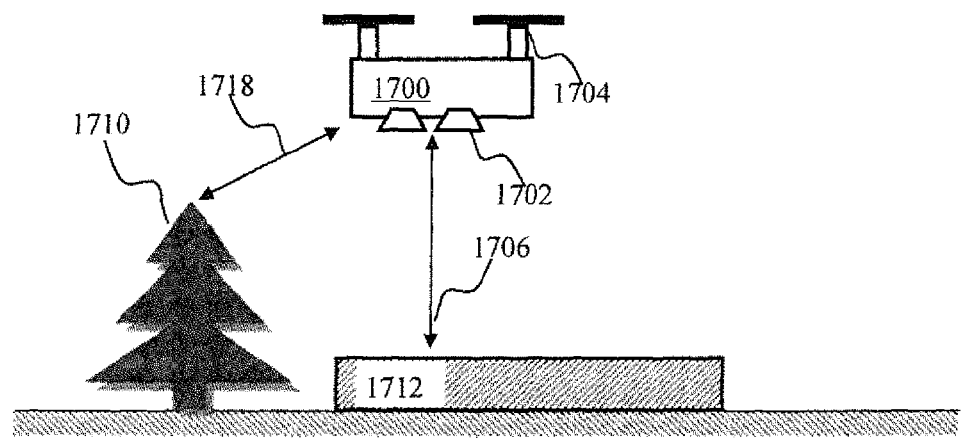
FIG. 17

APPARATUS AND METHODS FOR DISTANCE ESTIMATION USING MULTIPLE IMAGE SENSORS

CROSS-REFERENCE AND RELATED APPLICATIONS

This application is related to co-pending and co-owned U.S. patent application Ser. No. 14/285,385, entitled "APPARATUS AND METHODS FOR REAL TIME ESTIMATION OF DIFFERENTIAL MOTION IN LIVE VIDEO", filed herewith on May 22, 2014, and co-pending and co-owned U.S. patent application Ser. No. 14/285,466, entitled "APPARATUS AND METHODS FOR ROBOTIC OPERATION USING VIDEO IMAGERY", filed herewith on May 22, 2014, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates to, inter alia, computerized apparatus and methods for processing imagery from multiple sources.

Description of Related Art

Object recognition in the context of computer vision relates to finding a given object in an image or a sequence of frames in a video segment. Typically, video frames may contain multiple objects moving in one or more directions on a still or moving background. Object representations, also referred to as the "view", may change from frame to frame due to a variety of object transformations, such as rotation, movement, translation, change in lighting, background, noise, appearance of other objects, partial blocking and/or unblocking of the object, and/or other object transformations. Robotic devices often employ video for navigation, target selection and/or obstacle avoidance. Determining motion of object from a moving robotic platform may require implementation of differential motion detection in an energy efficient manner. Depth of visual scene (e.g., distance to one or more objects) may be useful for operation of mobile robots as well.

SUMMARY

One aspect of the disclosure relates to a non-transitory computer-readable storage medium having instructions embodied thereon, the instructions being executable to perform a method of determining a distance to an object.

In another aspect, a method of determining distance to an object is disclosed. In one implementation, the object is disposed within a visual scene, and the method includes: producing a video stream by interleaving images of a first plurality of images and a second plurality of images of the visual scene; and evaluating the video stream to determine the distance. In one variant, individual images of the first and second pluralities of images are provided by first and second cameras, respectively, the second camera being separated spatially from the first camera.

In another variant, the evaluation comprises determination of a binocular disparity between at least a portion of the second and the first pluralities of images, the disparity being related to the distance and the spatial separation; and the distance determination is based on the disparity determination.

In a further variant, the evaluation further comprises encoding the video stream using an encoder process comprising motion estimation, the motion estimation configured to provide information related to a displacement of a first representation of the object within a given image of the video stream relative a second representation of the object within a preceding image of the video stream. Individual ones of the first and second pluralities of images comprise for instance a plurality of pixels, and the encoder process includes one of e.g., MPEG-4, H.262, H.263, H.264, and H.265 encoders.

In another aspect, a non-transitory computer-readable storage medium having instructions embodied thereon is disclosed. In one implementation, the instructions are executable to produce a combined image stream from first and second sequences of images of a sensory scene by at least: selecting a first image and a second image from the second sequence to follow a first image from the first sequence, the second image from the second sequence following the first image from the second sequence; selecting second and third images from the first sequence to follow the second image from the second sequence, the third image from the first sequence following the second from the first sequence; and evaluating the combined image stream to determine a depth parameter of the scene.

In one variant, the first and the second image sequences are provided by a first and a second image sensor, respectively, the first image sensor being disposed spatially separated from the second image sensor. The first image sensor and the second image sensor are configured to provide images of the sensory scene, and the spatial separation is configured to produce a binocular disparity for the first image from the second sequence relative the first image from the first sequence; and the second image from the second sequence relative the second image from the first sequence. The depth is determined based on the disparity.

In another variant, individual images of the first image sequence and the second image sequence comprise a plurality of pixels; and the evaluating comprises encoding the combined stream using a motion estimation encoder.

In yet another variant, the combined image stream comprises the first image from the first sequence, followed by the first image from the second sequence followed by the second image from the second sequence followed by the second image from the first sequence followed by the third image from the first sequence. The motion estimation encoder is configured to, in one particular implementation: determine a first version of the disparity based on encoding the first image from the first sequence and the first image from the second sequence; determine a second version of the disparity based on encoding the second image from the second sequence and the second image from the first sequence, the second version of the disparity having an opposite sign relative the first version; determine a first motion of the second image sequence based on encoding the first image from the second sequence followed by the second image from the second sequence; and determine a second motion of the first image sequence based on encoding the second image from the first sequence followed by the third image from the first sequence.

In a further aspect, an image processing apparatus is disclosed. In one implementation, the apparatus includes: an input interface configured to receive a stereo image of a visual scene, the stereo image comprising a first frame and a second frame; a logic component configured to form a sequence of frames by arranging the first and the second frames sequentially with one another within the sequence; a video encoder component in data communication with the logic component and configured to encode the sequence of frames to produce a sequence of compressed frames; and a processing component in data communication with the video encoder and configured to obtain motion information based on an evaluation of the compressed frames.

In one variant, the sequence of compressed frames comprises a key frame characterized by absence of the motion information, and the processing component is configured to not utilize the key frame during the evaluation of the compressed frames.

In another variant, the processing component is further configured to determine, based on the motion information, a depth parameter associated with the visual scene. The input interface is further configured to receive another image comprising a third frame, the first, second and third frames being provided respectively by first, second, and third cameras disposed spatially separately from one another. The sequence of frames is formed by arranging the third frame sequentially with the first frame and the second frame.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 5A is a graphical illustration depicting triple camera configuration used for disparity determination using image interleaving, according to one or more implementations.

FIG. 5B is a graphical illustration depicting quad camera configuration used for disparity determination using image interleaving, according to one or more implementations.

FIG. 5C is a graphical illustration depicting linear multiple camera configuration useful for determining multiple depths scales using image interleaving, according to one or more implementations.

FIG. 6A is a graphical illustration depicting an alternating interleaving of triple image input for use with the motion extraction, according to one or more implementations.

FIG. 6B is a graphical illustration depicting an alternating interleaving of quad image input for use with the motion extraction, according to one or more implementations.

FIG. 9A is a graphical illustration depicting an encoded object for use with the motion extraction, according to one or more implementations.

FIG. 9B is a graphical illustration depicting motion of an encoded object for use with the motion extraction methodology, according to one or more implementations.

FIG. 9C is a graphical illustration depicting spatial distribution of motion extracted from encoded video, according to one or more implementations.

FIGS. 16A-16D illustrate gestures of a human operator used for communicating control indications to a robotic device (such as one comprising a distance determination apparatus as described herein), in accordance with one or more implementations.

FIG. 17 is a graphical illustration depicting an exemplary unmanned robotic apparatus comprising distance determination apparatus of the disclosure configured for autonomous navigation, in accordance with one or more implementations.

Figure 1A:
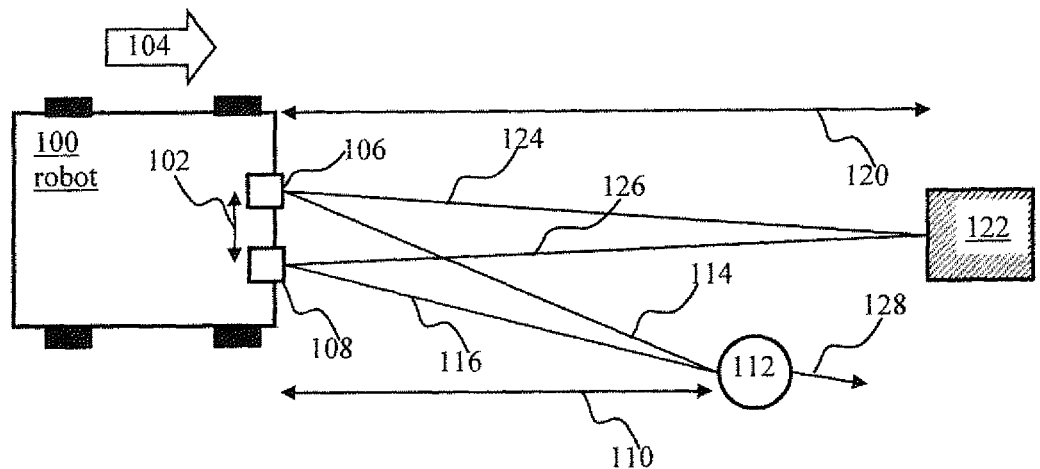
FIG. 1A is a graphical illustration depicting a top view of robotic apparatus configured to acquire stereo imagery, in accordance with one or more implementations.

All Figures disclosed herein are © Copyright 2014 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or methods) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., inband or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, among other things, apparatus and methods for determining depth of field of a scene based on processing information from multiple sources detecting motion of objects and/or features in video in real time. The video information may comprise for example multiple streams of frames received from a plurality of cameras disposed separate from one another. Individual cameras may comprise an image sensor (e.g., charge-coupled device (CCD), CMOS device, and/or an active-pixel sensor (APS), photodiode arrays, and/or other sensors). In one or more implementations, the stream of frames may comprise a pixel stream downloaded from a file. An example of such a file may include a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, infrared (IR), radar or tomography images may be equally compatible with the processing methodology of the disclosure, or yet other configurations.

The video processing methodology described herein may enable a robotic controller to obtain motion and/or distance information using a specialized hardware video encoder. Use of dedicated video encoders provides a computationally efficient way to determine motion and/or distance using video signals compared to processing techniques that employ general purpose processors for performing computations (e.g., optical flow, block matching, phase correlations and/or other. Computational efficiency of hardware video encoders may be leveraged top reduce energy use, complexity, size, and/or cost of the processing component, increase autonomy of robotic device using the computationally efficient controller, and/or increase processing performance (e.g., image resolution, frame rate, number of cameras) for a given hardware specifications compared to the prior art.

Processing data from multiple spatially distributed sources may enable depth of field determination using a disparity methodology. In some implementations of stereo vision, distance d to an object may be determined using binocular disparity D as follows:

$$d \propto \frac{1}{D} \quad \text{(Eqn. 1)}$$

Figure 4A:
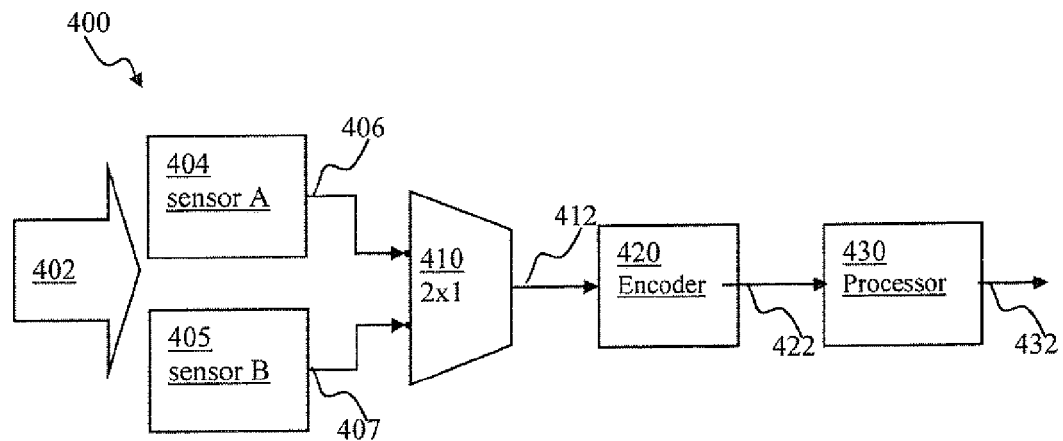
FIG. 4A is a functional block diagram depicting a processing apparatus configured to determine disparity from a dual image source, according to one or more implementations.
Figure 4B:
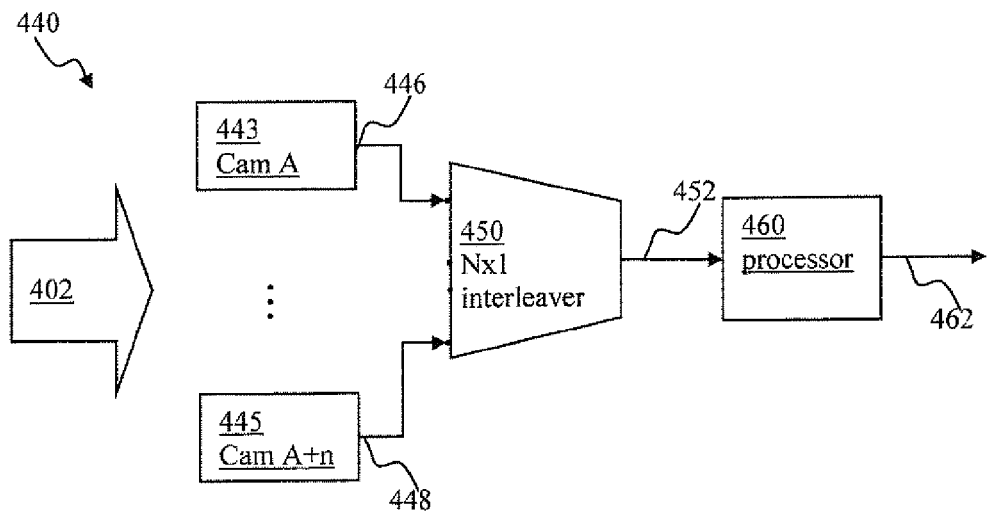
FIG. 4B is a functional block diagram depicting a processing apparatus configured to determine disparity from multiple image sources, according to one or more implementations.

FIG. 1A depicts a top view of mobile robotic apparatus comprising two cameras configured to provide sensory information for determining distance based on the disparity. The apparatus 100 may comprise for instance a robotic vehicle outfitted with a motion detection apparatus configured in accordance with one or more implementations, e.g., such as illustrated in FIGS. 4A-4B, below. The robotic apparatus 100 may comprise left and right cameras 106, 108 disposed at a distance 102 from one another. The robotic apparatus 100 may navigate in a direction 104. One or more obstacles may be present in path of the apparatus 100, e.g., a ball 112 and a box 122, disposed at distance 110, 120, respectively, from the apparatus 110. Due to the spatial separation 102 between the cameras 106, 108, travel paths from a given object (e.g., 114, 116 for the ball 112), 124, 126 for the box 122) may be unequal to one another. As shown in FIG. 1A, the path 114 is longer compared to the path 116, and the path 126 is longer than the path 124.

Difference in path lengths may cause a difference in apparent position of the objects 112, 122 in image frame(s) provided by the camera 106 relative the image frame provided by the camera 108.

Figure 2A:
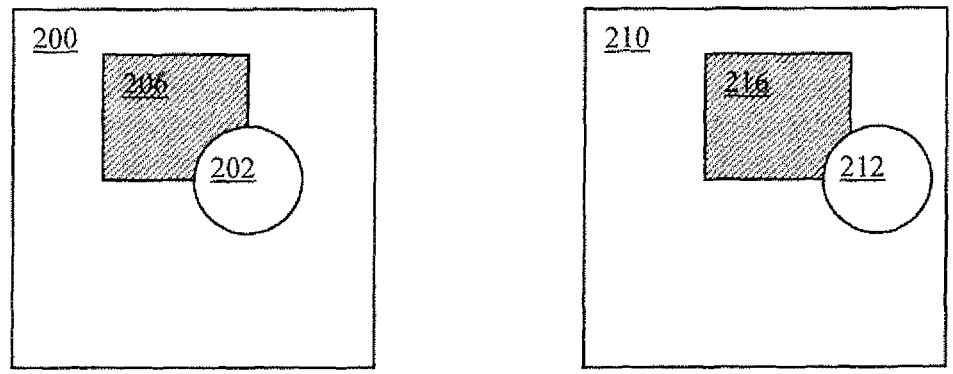
FIG. 2A is a graphical illustration depicting stereo imagery input obtained with two spatially displaced cameras for use with the disparity determination methodology, according to one or more implementations.

FIG. 2A depicts a typical stereo imagery input for use with the disparity determination methodology, according to one or more implementations. The frames 200, 210 in FIG. 2A may be acquired by the two spatially displaced cameras 106, 108 of the apparatus 100 in FIG. 1A. Object representations 216, 212 of the frame 210 may be displaced horizontally relative to object representations 206, 202, respectively, of the frame 200. Object representations 202, 212, 206, 216 may correspond to objects 112, 122, respectively, in FIG. 1A.

Figure 2B:
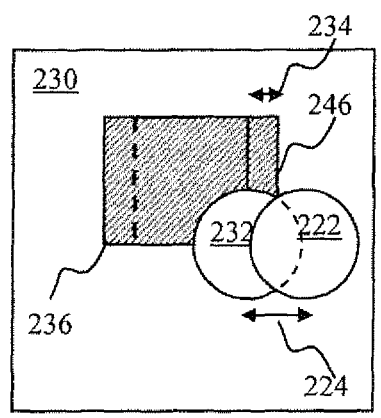
FIG. 2B is a graphical illustration depicting disparity between representations of objects corresponding to the frames of stereo imagery shown in FIG. 2A, according to one or more implementations.

FIG. 2B illustrates the disparity between representations of objects corresponding to the frames of stereo imagery shown in FIG. 2A. Object representations 236, 246 in frame 23 may be characterized by a horizontal disparity 234, and similarly object representations 222 232 may be characterized by a corresponding horizontal disparity 224. Disparity 224, 234 may be inversely proportional to distance between the camera and the respective object (e.g., the distance 110, 120 in FIG. 1A); i.e., the shorter the distance, the greater the disparity, due to the greater subtended arc.

Figure 1B:
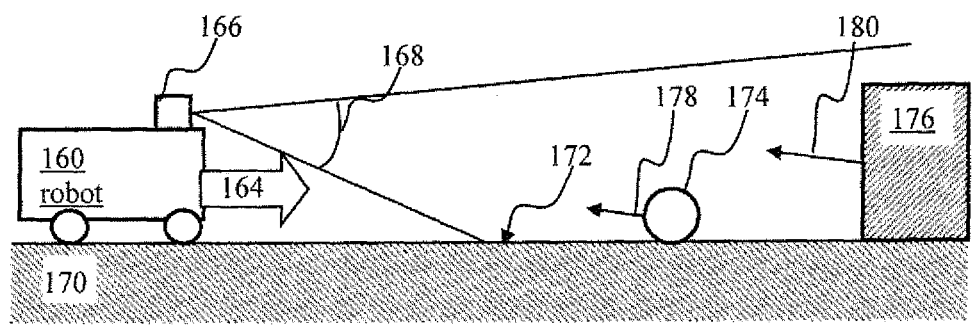
FIG. 1B is a graphical illustration depicting a side view of a robotic apparatus comprising an adaptive controller apparatus of the disclosure, configured for autonomous navigation, in accordance with one or more implementations.
Figure 7:
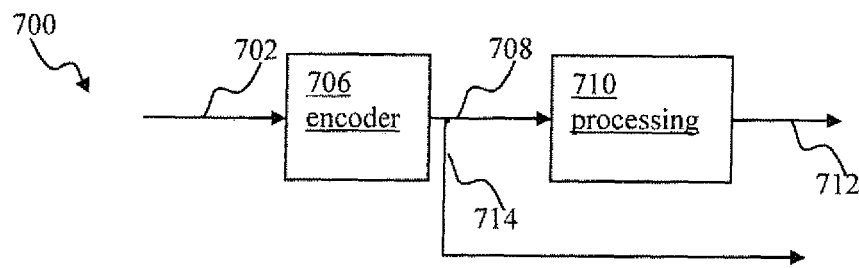
FIG. 7 is a functional block diagram depicting a motion extraction apparatus, according to one or more implementations.
Figure 8:
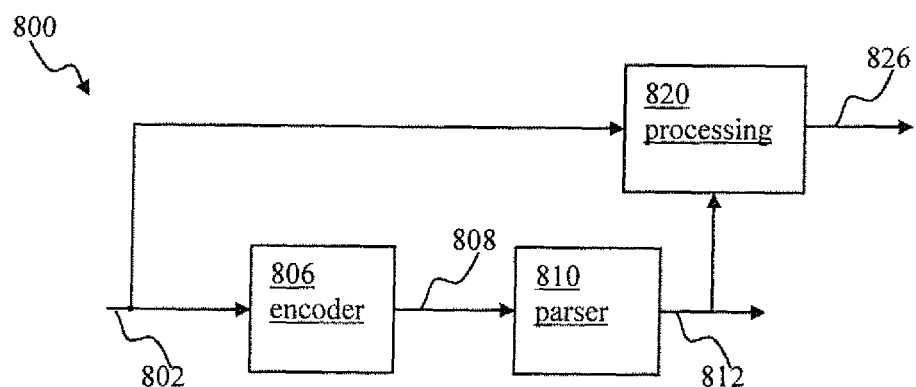
FIG. 8 is a functional block diagram depicting a video processing system, comprising a differential motion extraction apparatus, according to one or more implementations.

FIG. 1B depicts a mobile robotic apparatus comprising a motion detection apparatus configured, e.g., in accordance with the exemplary implementations illustrated in FIGS. 7-8, infra. The robotic apparatus 160 may comprise a camera 166. The camera 166 may be characterized by a field of view 168 (e.g., an extent of the observable world that may be captured by the camera lens at a given moment). The camera 166 may provide information associated with objects within the field of view 168. In some implementations, the camera 166 may provide frames of pixels of luminance and/or color, refreshed at 25 Hz frame rate. However, it will be appreciated that, in some implementations, other frame rates may be used (whether constant or variable), as may other types of information provided by the camera(s) 166.

One or more objects (e.g., a floor 170, a stationary object 176, a moving object (e.g., ball 174), and/or other objects) may be present in the camera field of view. The motion of the objects may result in a displacement of pixels representing the objects within successive frames, such as is described in U.S. patent application Ser. No. 13/689,717 filed on Nov. 29, 2012 and entitled "APPARATUS AND METHODS FOR OBJECT DETECTION VIA OPTICAL FLOW CANCELLATION", incorporated herein by reference in its entirety.

When the robotic apparatus 160 is in motion, such as shown by arrow 164 in FIG. 1B, motion of the objects within the camera 166 field if view 168 (e.g., denoted by arrows 172, 178, 180 in FIG. 1B) may comprise the self-motion component and the object motion component. By way of a non-limiting example, motion of objects in FIG. 1B may comprise apparent motion 180 of the stationary background 176 and the boundary (e.g., the component 172 associated with the floor boundary); (ii) component 178 associated with the moving ball 174 that comprises a superposition of the ball displacement and motion of the camera; and/or other components. As noted previously, determination of the ball 174 motion may be particularly challenging when the camera 160 is in motion (e.g., during panning) and/or when the field of view is changing (e.g., when zooming in/out).

Figure 2C:
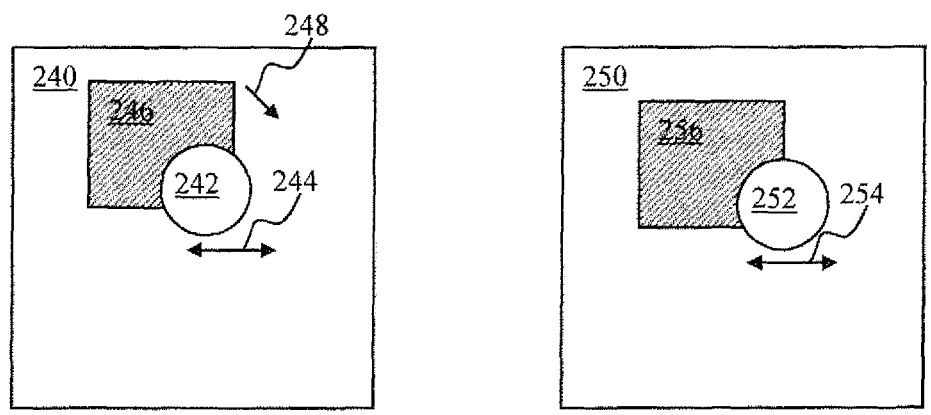
FIG. 2C is a graphical illustration depicting input frames comprising a plurality of moving objects for use with the motion extraction, according to one or more implementations.

FIG. 2C depicts two exemplary frames (e.g., provided by the camera 166 in FIG. 1A) comprising multiple moving objects useful with the motion estimation methodology described herein. The frames 240, 250 may comprise an object 246, 256 that may move in a given direction (e.g., 288). The frames 240, 250 may comprise an object 242, 252 that may move back and forth in a direction indicated by arrow 244. Motion along curved trajectories may be resolved by using linear piece-wise approximation, wherein motion between successive frames may be interpreted as linear. An increased frame rate and/or image resolution may be employed with complex motion trajectories. In some implementations of target approach by a robotic device, the object 242 may comprise a target (e.g., ball) that may be moved back and forth in order to indicate to a controller of, e.g., the robotic vehicle 160 in FIG. 1B, a target to follow. Frames 240, 250 may represent position of objects at two time instances. Due to the presence of multiple motions, detection of object 242, 252 may be not straightforward due to, for example, portions of the frames 250 being characterized by differential motion.

In some implementations of object detection in the presence of differential motion, background (and/or self-motion) may be determined using a statistical analysis of motion distribution within a given encoded frame. Various statistical parameters may be determined, e.g., median, mean plus/minus n standard deviations, and/or others, in order to determine one or more prevailing (dominant) motion vectors for the frame. The prevailing motion may be removed (e.g., via a vector subtraction) from the frame motion distribution in order to determine residual motion. The residual motion may be analyzed (e.g., using a threshold technique) in order to detect one or more features that may be moving differently from the prevailing motion.

In one or more implementations of object detection in the presence of differential motion, prevailing motion may be determined using a clustering technique. For example, a motion filed within the frame may be partitioned into a plurality of clusters based on analysis of motion distribution. The largest area cluster may be associated with the prevailing (dominant) motion, or may be removed (masked off) from the frame to obtain residual motion distribution. The residual motion may be analyzed in order to determine the presence of one or more features based on remaining clusters of motion.

In some implementations, image frames provided by a plurality of cameras (e.g., the cameras 106, 108 in FIG. 1A) may be utilized in order to determine depth of field and/or distance to objects using the disparity information. Comparing object representations 206, 202 of frame 200 to object representations 216, 212 of frame 210, the disparity may be considered as object motion occurring between the capture of frame 200 and the capture of frame 210 in FIG. 2A. The disparity (e.g., apparent motion) 224, 234 in FIG. 32B may be obtained using, in the exemplary implementation, motion estimation. Various motion estimation algorithms exist (e.g., optical flow methodology, such as that described in U.S. patent application Ser. No. 13/689,717 filed on Nov. 29, 2012 and entitled "APPARATUS AND METHODS FOR OBJECT DETECTION VIA OPTICAL FLOW CANCELLATION", incorporated herein by reference in its entirety, each of which may be used consistent with the various aspects of the present disclosure.

Figure 3A:
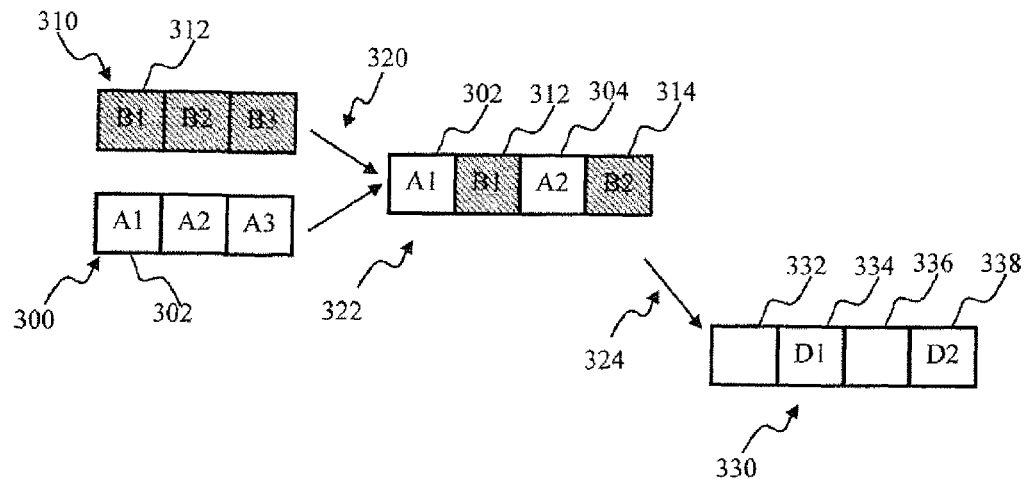
FIG. 3A is a logical block diagram depicting a determination of an input stream for motion processing using an alternating interleaver of stereo imagery input, according to one or more implementations.

In some implementations, the apparent motion due to disparity may be determined using motion estimation information provided by a video encoder. In order to enable motion estimation by an encoder, frames provided by individual cameras (e.g., 106, 108 in FIG. 1A) may be combined to form a common video stream. FIG. 3A illustrates determination of an input stream for motion processing using an alternating interleaver of stereo frame input, according to one or more implementations. In FIG. 3A, the frame sequences 300,310 (also referred to as channel A, B) may correspond to data provided by two cameras (e.g., left/right cameras 106, 108 in FIG. 1A), and/or data loaded from a disc or other source, in one or more implementations. The frame sequences 300, 310 comprising (e.g., frames 302, 312) may be processed by an alternating interleaver process 320 configured to produce an interleaved frame sequence 322. The sequence 322 may comprise alternating frames (e.g., 302, 312) from left/right cameras, in some implementations. In some implementations, the frames from left/right cameras (e.g., 302, 312) may be acquired simultaneous with one another using, e.g., multiple camera synchronization.

Figure 3B:
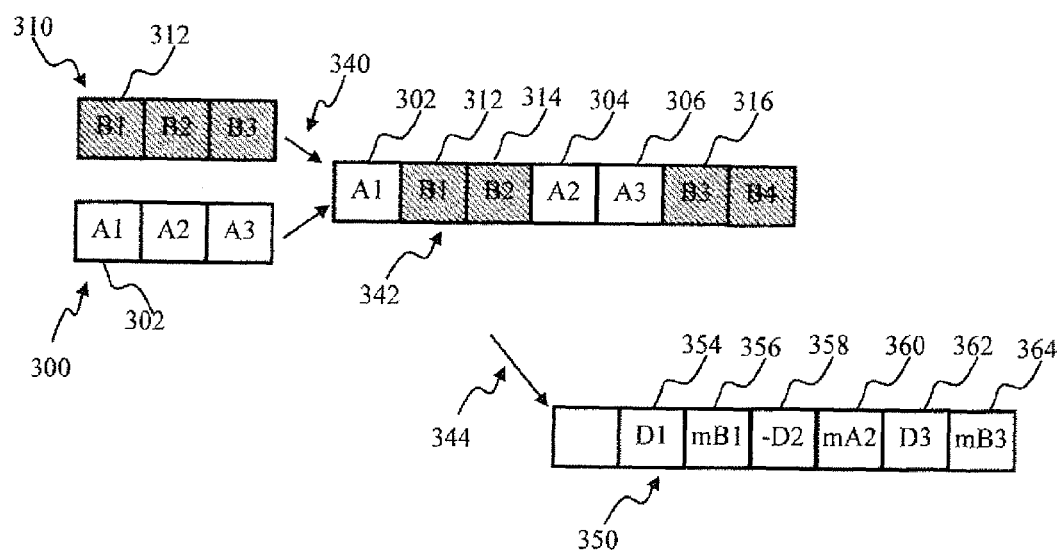
FIG. 3B is a logical block diagram depicting a determination of an input stream for motion processing using an alternating interleaver of stereo imagery input, according to one or more implementations.

FIG. 3B illustrates determination of an input stream for motion processing using an alternating interleaver of stereo frame input, according to one or more implementations. The A, B frame sequences 300, 310 comprising (e.g., frames 302, 312) may be processed by the alternating interleaver process 340 configured to produce an interleaved frame sequence 342. The sequence 342 may be configured to comprise alternating pairs of frames from a given channel. As shown in FIG. 3A, frames B1, B2 from channel B acquired at times t1, t2, may be followed by frames A1, A2 from channel A acquired at times t1, t2, followed by frames B3, B4 from channel B acquired at times t3, t4, wherein t4>t3>t2>t1. In some implementations (not shown), the frame A1 may be repeated and/or preceded by a blank frame in the interleaved sequence 342. Use of an alternating approach may provide, inter alia, both motion and disparity information within a single encoded stream.

Streams of interleaved frames (e.g., 322, 342 FIGS. 3A-3B, and/or shown in FIGS. 6A-6B, below) may be utilized in order to determine depth of field of view and/or distance to objects using motion encoding, as described in detail below with respect to FIGS. 4A-5.

FIG. 4A illustrates a processing apparatus configured to determine disparity from two image sources, according to one or more implementations. The apparatus 400 may comprise two image sources 404, 405 configured to provide information environment 402. In some implementations of visual data processing, the sources 404, 405 may comprise digital and/or analog cameras disposed separate from one another. Individual cameras may comprise an image sensor (CCD, CMOS device, and/or an APS, photodiode arrays, and/or other sensors). It will be appreciated that in some implementations, such separation between the image sensors may be achieved even when the sensors are disposed on the same substrate or "chip" (e.g., two sensors placed at opposite ends of the same substrate/chip). In one or more implementations, the image sources 4054, 405 may comprise video files on a storage device. An example of such a file may include a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, IR, radar, or tomography images may be equally compatible with the processing methodology of the disclosure, or yet other configurations.

Image frames 406, 407 provided by the sources 404, 405 may be interleaved by the interleaver apparatus 410. In some implementations, the interleaver apparatus 410 may comprise 2×1 multiplexer configured to provide one of the input channels 406, 407 at its output 412 at a given time. The output 412 may comprise an alternating interleaved stream (e.g., 322), an alternating interleaved stream of frames (e.g., 342 in FIG. 3B), or yet other option, in accordance with one or more implementations.

The interleaved output 412 may be provided to a motion estimation component 420. In one or more implementations, the motion estimation component may comprise a video encoder comprising one or more motion estimation operations. The component 420 may comprise for instance a dedicated integrated circuit (IC) disposed on a single or multiple die), a component of a processing system (e.g., video encoder block of a Snapdragon® system on a chip), an ASIC, an FPGA with a video encoder intellectual property (IP) core, an OEM printed circuit board, and/or other. Video encoding effectuated by the component 420 may comprise any applicable standard comprising motion estimation between one or more current images and one or more preceding images. Some exemplary encoding implementations include H.264/MPEG-4 advanced video coding described, e.g., in *ISO/IEC* 14496-10, 2009—*MPEG-4 Part 10, Advanced Video Coding*, H.263 standard described in, e.g., *ITU-T H.263 TELECOMMUNICATION STANDARDIZATION SECTOR OF ITU* (01/2005) *SERIES H: AUDIOVISUAL AND MULTIMEDIA SYSTEMS Infrastructure of audiovisual services—Coding of moving video, Video coding for low bit rate communication*; H.262/MPEG-2, described in e.g., *ISO/IEC* 13818-2 2013-10-01 *Information technology—Generic coding of moving pictures and associated audio information—Part 2: Video*, H.265 standard described in, e.g., *ITU-T H.263 TELECOMMUNICATION STANDARDIZATION SECTOR OF ITU* (04/2013), *SERIES H: AUDIOVISUAL AND MULTIMEDIA SYSTEMS Infrastructure of audiovisual services—Coding of moving video, High efficiency video coding*; each of the foregoing being incorporated herein by reference in its entirety. See also Exhibit I hereto, which contains exemplary computer code useful for processing image data consistent with, e.g., the ISO/IEC 1196-10 and H.265 Standards referenced above.

In some implementations, the motion estimation component 420 may comprise logic configured to determine motion using optical flow, and/or other motion estimation algorithms such as but not limited to: block-matching algorithm, phase correlation, as well as determining locations of one or more features and estimating the motion of individual detected features.

Output 422 of the motion estimation component may be provided to a processing component 430 configured to determine one or more parameters of interest, including e.g., depth of the scene 402 and/or distance to objects that may be present in the scene, using motion based disparity determination methodology.

Returning now to FIG. 3A, the encoding of the interleaved frame sequence 322 by the motion estimation component 420 of FIG. 4A is depicted by arrow 324. In some implementations, the component 420 may comprise MPEG-4/H.264 encoder configured to produce the encoded stream 330. The encoding of frame pair 302, 312 may produce motion information for the encoded frame 334. The motion information of the frame 334 may comprise e.g., horizontal and/or vertical displacement (dx, dy) of blocks of pixels (macroblocks) and be interpreted as caused by a disparity between scene representations of frame 302 and frame 304. In some implementations of stereo vision (e.g., as described above with respect to FIG. 1A), analysis of motion information for the frame 334 (performed by the component 430 in FIG. 4A) may produce the disparity D between left and right image frames. As shown in FIG. 3A, the encoded frames 334, 338 may provide disparity estimates D1, D2 associated with frames acquired at times t1, t2. Frames 332, 336 may be ignored (skipped) for the purposes of the disparity determination. Disparity estimates D1, D2 may be used to determine distance to one or more objects within the frames 330.

In one or more implementations, the component 430 may be configured to parse the compressed video stream 422 in order to obtain motion information (e.g., map of vectors 916 in FIG. 9A). By way of an illustration, the motion information may comprise a macroblock location L (e.g., index), x-component, and y-component of motion of pixels associated with the macroblock location L. The extracted motion information may be used for disparity and or distance determination. Output 432 of the component 430 may be provided to another component (e.g., a controller of a robot). Various uses of the depth information are contemplated such as, for example, object detection, object localization, distance estimation, trajectory planning, gesture detection, and/or others that will be recognized by those of ordinary skill when provided the present disclosure.

Returning now to FIG. 3B, encoding of the interleaved frame sequence 342 by the motion estimation component 420 of FIG. 4A is depicted by arrow 344 in FIG. 3B. In some implementations, the component 420 may comprise MPEG-4/H.264 encoder configured to produce encoded stream 350. In encoding of frame pair 302, 312 may produce motion information for the encoded frame 354. The motion information of the frame 354 may comprise horizontal and/or vertical displacement (dx, dy) of blocks of pixels and be interpreted as caused by a disparity between scene representations of frame 302 and frame 304. In some implementations, of stereo vision (e.g., as described above with respect to FIG. 1A) analysis of motion information for the frame 354 (performed by the component 430 in FIG. 4A) may produce the disparity D between left and right image frames. As shown in FIG. 3B, the encoded frames 354, 362 may provide disparity estimates D1, D3 associated with frames acquired at times t1, t3. The encoded frame 358 may provide negative disparity estimate (−D2) associated with frames acquired at time t2. Frames 356, 364 may provide motion information associated with the frame sequence 310. Frame 360 may provide motion information associated with the frame sequence 300. Disparity estimates D1, D2, D3 may be used to determine distance to one or more objects within the frames 350 using, e.g., Eqn. 1.

Although interleaving of frames from two sources is illustrated in FIGS. 3A-3B, the methodology described herein may be employed for any practical number of sources (e.g., three, four as shown and described with respect to FIGS. 5A-5C below, and/or a greater number of sources).

FIG. 4B illustrates a processing apparatus configured to determine disparity from two or more image sources, according to one or more implementations. The apparatus 440 may comprise a plurality of image sources (e.g., 443, 445) configured to provide information related to the environment 402. In some implementations of visual data processing, the sources 443, 445, 405 may comprise sources described with respect to FIG. 4A above.

Image frames 446, 448 provided by the sources 443, 445 may be interleaved by the interleaver apparatus 450. In some implementations, the interleaver apparatus 450 may comprise N×1 multiplexer configured to provide date from one of the input channels 446, 448 at its output 452 at a given time. The output 452 may comprise an alternating interleaved stream (e.g., 600 in FIG. 6A), an alternating interleaved stream of frames (e.g., constructed similar to the stream 342 in FIG. 3B) in accordance with one or more implementations.

The interleaved output 452 may be provided to a processing component 460. The component 460 may comprise motion estimation logic. In one or more implementations, the motion estimation logic may comprise a video encoder comprising motion estimation operation. The component 460 may comprise a dedicated integrated circuit (IC) disposed on a single or multiple die), a component of a processing system (e.g., video encoder block of a Snapdragon® system on a chip), an ASIC, an FPGA with a video encoder intellectual property (IP) core, an OEM printed circuit board, and/or other. Video encoding effectuated by the component 460 may comprise any applicable standard comprising motion estimation between current frame and preceding frame. In some implementations, the motion estimation component 460 may comprise logic configured to determine motion using optical flow, and/or other motion estimation algorithms such as but not limited to: block-matching algorithm, phase correlation, as well as determining locations of features and estimating the motion of those features. In one or more implementations wherein the input 452 may be encoded using a video encoder (e.g., MPEG-4, H.265), the component 460 may be configured to parse the encoded video stream in order to obtain motion information (e.g., map of vectors 916 in FIG. 9A).

The component 460 may comprise logic configured to determine depth of the scene 402 and/or distance to objects that may be present in the scene using motion determined based disparity determination methodology. The extracted motion information may be used for disparity and or distance determination. Output 462 of the component 460 may be provided to another component (e.g., a controller of a robot). Various uses of the depth information may be contemplated such as, for example, object detection, object localization, distance estimation, trajectory planning, gesture detection, and/or others. Determining motion disparity and/or the distance may be performed for example using operations described above with respect to FIGS. 3A-4A. In some implementations of an encoder with motion estimation (e.g., MPEG-4/H.264), the encoded stream 330, and/or stream 350 in FIGS. 3A-3B and/or stream 422 in FIG. 4A may comprise one or more frames (also referred to as keyframes) that may not contain motion information. The processing component 430 and/or 460 of FIGS. 4A-4B may be configured to detect and ignore (e.g., skip) frames that do not convey motion information.

The apparatus 440 of FIG. 4B may be utilized with multi-camera configurations, e.g., such as described below with respect to FIGS. 5A-5C. FIG. 5A illustrates a triple-camera configuration useful with disparity determination using image interleaving, according to one or more implementations. The camera configuration 500 may comprise three cameras 510, 520, 530, denoted A, B, C, respectively. In one or more implementations, the configuration 500 may comprise a pair of horizontally spaced cameras (e.g., left 510, right 520) and a vertically spaced camera (530). In some implementations (e.g., such as illustrated in FIG. 5C), the cameras 510, 520, 530 may be disposed in a linear array, and/or another configuration. Frames provided by the cameras 510, 520, 530 may be interleaved using any applicable methodologies, including these described with respect to FIGS. 3A-3B, and/or 6A herein.

Various interleaving sequences may be employed when processing frames provided by the cameras 510, 520, 530. By way of illustration, encoding interleaved frame stream ABCA . . . (e.g., the stream 600 shown in FIG. 6A) comprising frames provided by the cameras 510, 520, 530 using a motion estimation encoder, may provide motion due to disparity shown by arrows 504, 514, 524 in FIG. 5A. Encoding interleaved frame stream ACBA . . . , (e.g., 610 in FIG. 6A) using a motion estimation encoder, may provide motion due to disparity shown by arrows 526, 516, 506 in FIG. 5A. Various other interleaving sequences may be utilized, such as, for example, ABBCCAABBCCAA . . . , BACA . . . and/or other.

FIG. 5B illustrates a quad-camera configuration useful with disparity determination using image interleaving, according to one or more implementations. The camera configuration 550 may comprise four cameras 550, 552, 556, 558, denoted A, B, C, D, respectively. In one or more implementations, the configuration 550 may comprise two pairs of horizontally spaced cameras (e.g., left top 550, right top 552 and left bottom 550, right bottom 556) vertically spaced from one another. Various other spatial camera configurations may be utilized as well. Frames provided by the cameras 552, 554, 556, 558 may be interleaved using any applicable methodologies, including these described with respect to FIGS. 3A-3B, and/or 6B.

Various interleaving sequences may be employed when processing frames provided by the cameras 552, 554, 556, 558. By way of illustration, encoding interleaved frame stream ABCDA . . . (e.g., the stream 620 shown in FIG. 6B) comprising frames provided by the cameras 552, 554, 556, 558 using a motion estimation encoder may provide motion due to disparity shown by arrows 562, 564, 566, 568 in FIG. 5B. Encoding the interleaved frame stream ADCBA . . . , (e.g., 638 in FIG. 6B) using a motion estimation encoder, may provide motion due to disparity shown by arrows 569, 567, 565, 563 in FIG. 5B. Various other interleaving sequences may be utilized, such as, for example sequences 624, 628, 630, 634 illustrated in, FIG. 6B may be utilized. Sequences comprising transitions between diagonally opposing cameras in FIG. 5B (e.g., AC, CA, BD, DB and/or other) may be used to, inter alia, determine disparity shown by arrows 544, 546.

FIG. 5C illustrates a linear multiple sensor element configuration useful with determining multiple depths scales using image interleaving, according to one or more implementations. The configuration 570 may comprise sensor elements 572, 574, 576, 578 disposed in a linear array. In one or more implementations, individual sensor elements may comprise cameras or camera sensors. Spacing between the elements 572, 574, 576, 578 may be the same (uniform linear array) and/or varying (e.g., a power law, random, and/or other). In some implementations, non-uniform spacing may be used in order to implement e.g., a Vernier scale.

Various interleaving sequences may be employed when processing frames provided by the elements 572, 574, 576, 758, such as, for example sequences 620, 624, 628, 630, 634, 638 illustrated in, FIG. 6B and/or other sequences (e.g. ABBCCDDAA . . . ). Use of multiple elements of the array 570 may enable determination of multiple disparity estimations, e.g., shown by arrows 580, 582, 584, 586, 588, 590. In some implementations, the frames from individual sensor elements shown and described above with respect to FIGS. 5A-5C (e.g., 510, 520, 530) may be acquired simultaneous with one another using, e.g., multiple camera synchronization. The disparity estimations corresponding to different sensor spacing (e.g., shown by arrows 580, 582, 584, 586, 588, 590 in FIG. 5C) may be characterized by different dynamic range, different resolution, and/or precision, e.g., in accordance with Eqn. 1. By way of an illustration, closely spaced sensing elements (e.g., 572, 574) may be capable of determining distance to objects disposed farther from the array as compared to wide spaced elements (e.g., 572-578). Wide spaced elements (e.g., 572-578) may be capable of determining distance to objects with greater precision (e.g., lower uncertainty) as compared to estimates produced by closely spaced sensing elements (e.g., 572, 574).

In some implementations, multiple elements (e.g., 572, 574, 576, 758) may be disposed in a non-linear array (e.g., rectangular and/or concave) thereby providing multiple perspectives and/or views of the scene to the processing component. Some views/perspectives may, e.g., reveal objects that may be hidden and/or partially obscured in other perspectives, thereby enabling more robust determination of object distance and/or object detection. In some implementations, individual distance estimates (associated with individual camera pairs) may be combined using any appropriate methodologies (e.g., averaging, thresholding, median filtering), and/or other techniques to obtain a resultant distance estimate, characterized by greater precision and/or accuracy compared to individual estimates. In one or more implementations, a distance estimate associated with one camera pair may be selected as the resultant distance estimate, thereby enabling robust distance determination in presence of occlusions that may (at least partly) block the object in a given set of frames.

FIG. 7 depicts a motion extraction apparatus, according to one or more implementations. The apparatus 700 may comprise an encoder component 706 configured to encode input video stream 702. The input 702 may comprise one or more frames received from an image sensor (e.g., charge-coupled device (CCD), CMOS device, and/or an active-pixel sensor (APS), photodiode arrays, and/or other image sensors). In one or more implementations, the input may comprise a pixel stream downloaded from a file. An example of such a file may include a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

The component 706 may comprise a specialized video encoder configured to implement video encoding comprising a motion estimation operation. In one or more implementations, the component 706 may comprise a dedicated integrated circuit (IC) disposed on a single or multiple die), a component of a processing system (e.g., video encoder block of a Snapdragon® system on a chip), an ASIC, an FPGA with a video encoder intellectual property (IP) core, an OEM printed circuit board, and/or other. Video encoding effectuated by the component 706 may comprise any applicable standard comprising motion estimation between current frame and preceding frame. Some encoding implementations may comprise MPEG-4, H.262, H.263, H.264, H.265 video encoder such as described above with respect to FIG. 4A supra.

The component 706 may provide encoded video output 708. The output 708 may be characterized by a lower data rate (e.g., as represented by fewer bits per frame) as compared to the input video signal 702. The output 708 may comprise pixel luminance and/or chromaticity data. The output 708 may comprise motion information, e.g., as illustrated in FIG. 9A which depicts output of a video encoder useful with the motion extraction methodology. In one or more implementations, the output illustrated in FIG. 9A may correspond to occurrence of an object, e.g., moving ball represented by a hashed circle 900 in FIG. 9A in input 702 of FIG. 7. The encoded output 708 may comprise a luminance component (also referred to as "luma") depicted by area 902 in FIG. 9A. The encoded luminance may be comprised of a plurality of macroblocks 904. Size of the macroblock may be configured in accordance with specifications of an application (e.g., encoding standard, video frame size, resolution, quality, refresh rate, bit depth, channel (e.g., luma, chroma), and/or other and be selected, for example, at 16×16 for luma channel, 8×8 for chroma channel for H.264 encoder.

The encoded output 708 (that also may be referred to as the compressed video) may comprise motion information, denoted by area 910 in FIG. 9A. Motion information may comprise one or more vectors (e.g., 916) associated with one or more macroblock (e.g., 914).

Compressed video 708 in FIG. 7 may be provided to a processing component 710. The component 710 may be configured to parse the compressed video stream 708 in order to obtain motion information (e.g., map of vectors 916 in FIG. 9A). By way of an illustration, the motion information may comprise a macroblock location L (e.g., index), x-component, and y-component of motion of pixels associated with the macroblock location L. The extracted motion information 712 may be provided to another component. Various uses of the motion information may be contemplated such as, for example, object detection by recognizing the shape of the surface of the object, and/or by using depth to segment the scene, gesture detection by determining the orientation of the hands or other body parts, and/or other. In some implementations, the compressed video may be provided via a pathway 714 to a target destination (e.g., general purpose processor for streaming to a display and/or other components).

FIG. 8 depicts a video processing system, comprising a differential motion extraction apparatus, according to one or more implementations. The system 800 of FIG. 8 may be configured to receive sensory input 802. In some implementations, the input 802 may comprise the input 702 described above with respect to FIG. 7. The input 802 may be encoded by a video encoder component 806. In one or more implementations, the component 806 may comprise the component 706 described above with respect to FIG. 7. The component 806 may be configured to encode the input 802 using one or more encoding formats (e.g., H.264). The encoded signal 808 may be provided to component 810. In some implementations, the component 810 may be configured to parse the encoded signal 808 to extract motion information 812 by, e.g., extracting from the compressed video data the P slice (P-frame) data which contains the motion information (x and y components) or the macroblock motion for all macroblocks covering the current frame. The extracted motion information may be used in controlling a robotic device.

The extracted motion information (e.g., 712, 812 in FIGS. 7-8, respectively) may comprise horizontal and/or vertical displacement (e.g., the motion vector components (dx, dy)) of a pixel group (e.g., a macroblock) between the current frame and a preceding frame. In some implementations of video encoding useful with a pipeline-based multimedia framework (see, e.g., GStreamer framework, http://gstreamer.freedesktop.org/) the parsed motion information may be represented using the YUV color model. In one such implementation, the (U,V) channels may represent the (dx,dy) displacement and the Y channel may be used for representing additional information (e.g., indicates as to whether the current frame is the keyframe, macroblock size (e.g., 16×16, 8×8 and/or other size, and/or other information). Using the (Y,U,V) model to represent motion information may advantageously reduce computational load on, e.g., the component 820, and enable access to motion information without necessitating further decoding/encoding operations in order to extract the motion vector components.

The input 802 may be processed by a processing component 820. The component 820 may comprise an artificial neuron network (ANN) comprising a plurality of nodes. Individual nodes of the component 820 network may comprise neuron units characterized by a receptive field, e.g., region of space in which a presence of a stimulus may affect response of the neuron. In some implementations, the units may comprise spiking neurons and the ANN may comprise a spiking neuron network, (SNN). Various implementations of SNNs may be utilized consistent with the disclosure, such as, for example, those described in co-owned, and co-pending U.S. patent application Ser. No. 13/774,934, entitled "APPARATUS AND METHODS FOR RATE-MODULATED PLASTICITY IN A NEURON NETWORK" filed Feb. 22, 2013, Ser. No. 13/763,005, entitled "SPIKING NETWORK APPARATUS AND METHOD WITH BIMODAL SPIKE-TIMING DEPENDENT PLASTICITY" filed Feb. 8, 2013, Ser. No. 13/152,105, filed Jun. 2, 2011 and entitled "APPARATUS AND METHODS FOR TEMPORALLY PROXIMATE OBJECT RECOGNITION", Ser. No. 13/487,533, filed Jun. 4, 2012 and entitled "SYSTEMS AND APPARATUS FOR IMPLEMENTING TASK-SPECIFIC LEARNING USING SPEAKING NEURONS", Ser. No. 14/020,376, filed Sep. 6, 2013 and entitled "APPARATUS AND METHODS FOR EVENT-BASED PLASTICITY IN SPIKING NEURON NETWORKS", Ser. No. 13/548,071, filed Jul. 12, 2012 and entitled "SPIKING NEURON NETWORK SENSORY PROCESSING APPARATUS AND METHODS", commonly owned U.S. patent application Ser. No. 13/152,119, filed Jun. 2, 2011, entitled "SENSORY INPUT PROCESSING APPARATUS AND METHODS", Ser. No. 13/540,429, filed Jul. 2, 2012 and entitled "SENSORY PROCESSING APPARATUS AND METHODS", Ser. No. 13/623,820, filed Sep. 20, 2012 and entitled "APPARATUS AND METHODS FOR ENCODING OF SENSORY DATA USING ARTIFICIAL SPIKING NEURONS", Ser. No. 13/623,838, filed Sep. 20, 2012 and entitled "SPIKING NEURON NETWORK APPARATUS AND METHODS FOR ENCODING OF SENSORY DATA", Ser. No. 12/869,573, filed Aug. 26, 2010 and entitled "SYSTEMS AND METHODS FOR INVARIANT PULSE LATENCY CODING", Ser. No. 12/869,583, filed Aug. 26, 2010, entitled "INVARIANT PULSE LATENCY CODING SYSTEMS AND METHODS", Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", Ser. No. 13/152,084, filed Jun. 2, 2011, entitled "APPARATUS AND METHODS FOR PULSE-CODE INVARIANT OBJECT RECOGNITION", Ser. No. 13/239,255 filed Sep. 21, 2011, entitled "APPARATUS AND METHODS FOR SYNAPTIC UPDATE IN A PULSE-CODED NETWORK", Ser. No. 13/487,576 entitled "DYNAMICALLY RECONFIGURABLE STOCHASTIC LEARNING APPARATUS AND METHODS", filed Jun. 4, 2012, and U.S. Pat. No. 8,315,305, entitled "SYSTEMS AND METHODS FOR INVARIANT PULSE LATENCY CODING" issued Nov. 20, 2012, each of the foregoing being incorporated herein by reference in its entirety.

Receptive fields of the network 820 units may be configured to span several pixels with the input 802 frames so as to effectuate sparse transformation of the input 802. Various applicable methodologies may be utilized in order to effectuate the sparse transformation, including, for example, those described in co-pending and co-owned U.S. patent application Ser. No. 13/540,429, entitled "SENSORY PROCESSING APPARATUS AND METHODS", filed Jul. 2, 2012, and U.S. patent application Ser. No. 13/623,820, entitled "APPARATUS AND METHODS FOR ENCODING OF SENSORY DATA USING ARTIFICIAL SPIKING NEURONS", filed on Sep. 20, 2012, each of the foregoing being incorporated herein by reference in its entirety. In some implementations, the encoding may comprise a sparse transformation, described in, e.g., U.S. patent application Ser. No. 14/191,383, entitled "APPARATUS AND METHODS FOR TEMPORAL PROXIMITY DETECTION", filed on Feb. 26, 2014, the foregoing being incorporated herein by reference in its entirety.

The output 812 of the encoder 820 may be provided to the processing component 820. In some implementations, the component 820 may use the motion information 812 in order to determine characteristics (e.g., location, dimension, shape, and/or other) of one or more objects in sensory input 802. In one or more implementations, the component 820 may comprise an adaptive predictor component configured to determine a control output 826 for a robotic device (e.g., the vehicle 100, 160 in FIGS. 1A-1B) based on the input 812 and/or inputs 802, 812. In some implementations of autonomous vehicle navigation, the input 812 and/or 802 may be used by the component 820 in order to predict control signal configured to cause the vehicle 160 in FIG. 1B to execute an obstacle avoidance action. Various implementations of predictors may be employed with the motion detection approach described herein, including, e.g., U.S. patent application Ser. No. 13/842,530, entitled "ADAPTIVE PREDICTOR APPARATUS AND METHODS", filed on Mar. 15, 2013, the foregoing being incorporated herein by reference in its entirety.

FIG. 9B illustrates motion of an object obtained from encoded video, according to one or more implementations. Hashed area 922 in FIG. 9B may represent luminance component of an image of a ball (e.g., 900 in FIG. 9A). The encoded output as shown in FIG. 9B may comprise motion information, denoted by area 920. Motion information may comprise one or more vectors (e.g., 926) associated with one or more macroblock (e.g., 924). Encoded representations of FIGS. 9A-9B may be used to determine temporal distribution of motion associated with the ball 900. Motion pattern comprising alternating opposing motion vectors 916, 926 may be employed to communicate an action indication to a robotic device. In some implementations, a user may shake an object from left to right in front of a camera of an autonomous vehicle in order to indicate a target to be followed.

FIG. 9C illustrates spatial distribution of motion extracted from encoded video, according to one or more implementations. The representation shown in FIG. 9C may comprise portion 930 comprising a first plurality of macroblocks 932 characterized by first motion direction 936. The representation shown in FIG. 9C may comprise portion 940 comprising a second plurality of macroblocks 942 characterized by second motion direction 946. The spatial motion map illustrated in FIG. 9C may be employed to communicate an action indication to a robotic device. In some implementations, a user wave arms (in a crisscross manner) in order to indicate to a robotic device a stop, and/or other command.

In some implementations (not shown) motion information for a given frame may be characterized by a plurality of different motion vectors due to, e.g., motion of different objects, camera pan/zoom operation, and/or video acquisition from a moving platform. By way of an illustration of operation of the robotic vehicle 160 of FIG. 1B, video signal obtained by the camera 166 may comprise a representation of human making gestures superimposed on a moving background. Detection of one motion associated with the gestures on a background motion may be referred to as differential motion detection. In some implementations, the background may be characterized by spatially coherent (uniform) motion. Background motion for a given frame may be estimated and removed. The resultant motion field may be analyzed in order to determine, e.g., hand gesture(s) and/or objects. In one or more implementations, a sequence of frames may be characterized by the background motion that is temporally coherent over timescale associated with the frame sequence. Background motion for the sequence of frames may be estimated and removed from individual frames within the sequence. The resultant motion field may be analyzed in order to determine, e.g., hand gesture(s) and/or objects.

FIGS. 10-15 illustrate methods 1000, 1100, 1200, 1300, 1400, 1500 for determining and using motion information from encoded video. The operations of methods 1000, 1100, 1200, 1300, 1400, 1500 presented below are intended to be illustrative. In some implementations, method 1000, 1100, 1200, 1300, 1400, 1500 may be accomplished with one or more additional operations not described, and/or without one or more of the operations discussed. Additionally, the order in which the operations of method 1000, 1100, 1200, 1300, 1400, 1500 are illustrated in FIGS. 10-15 and described below is not intended to be limiting.

In some implementations, methods 1000, 1100, 1200, 1300, 1400, 1500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 1000, 1100, 1200, 1300, 1400, 1500 in response to instructions stored electronically on an electronic storage medium. The one or more processing devices may include one or more devices configured through hardware, firmware, and/or software to be specifically designed for execution of one or more of the operations of methods 1000, 1100, 1200, 1300, 1400, 1500.

Figure 10:
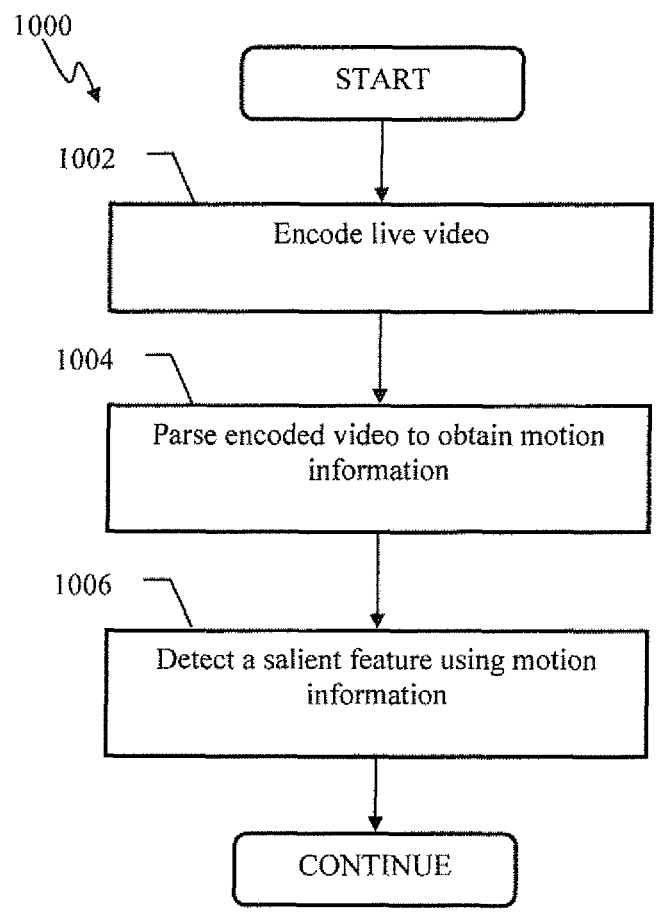
FIG. 10 is a logical flow diagram illustrating a method of determining a salient feature using encoded video motion information, in accordance with one or more implementations.

FIG. 10 illustrates a method of determining a salient feature using encoded video motion information, in accordance with one or more implementations.

Operations of method 1000 may be applied to processing of sensory data (e.g., audio, video, RADAR imagery, SONAR imagery, and/or other imagery), observation data, motor command activity in a robotic system, and/or other systems or data.

At operation 1002 of method 1000, one or more a consecutive input video frames may be encoded. In one or more implementations, the frames may be provided by an image sensor (e.g., CCD, CMOS device, and/or APS, photodiode arrays, and/or other image sensors). In some implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance YUV, YCbCr, CMYK, grayscale, and/or other image representations) may be applicable to and useful with the various implementations. Data frames corresponding to other (non-visual) signal modalities such as sonograms, IR, radar or tomography images may be compatible with the processing methodology of the disclosure, and/or other configurations. The frames may form real-time (live) video. In one or more implementations, the encoding may comprise operations performed in accordance with any applicable encoding standard comprising motion estimation between successive frames (e.g., H.263, H.264, and/or other).

At operation 1004 encoded video may be parsed in order to obtain motion information. In some implementations, the motion information may comprise a plurality of motion vectors and their locations as associated with one or more macroblocks within the encoded frame (e.g., the vector 916 of macroblock 914 in FIG. 9A).

At operation 1006 a salient feature may be determined using motion information. In one or more implementations, the feature determination may be based on analysis of motion spatial map within a given frame (e.g., the motion map comprising the area 930, 940 in FIG. 9C). In one or more implementations, the feature determination may be configured based on analysis of motion temporal characteristics (e.g., persistence of motion features in a given location over multiple frames, comparing motion at a given location between two or more frames, and/or other).

Figure 11:
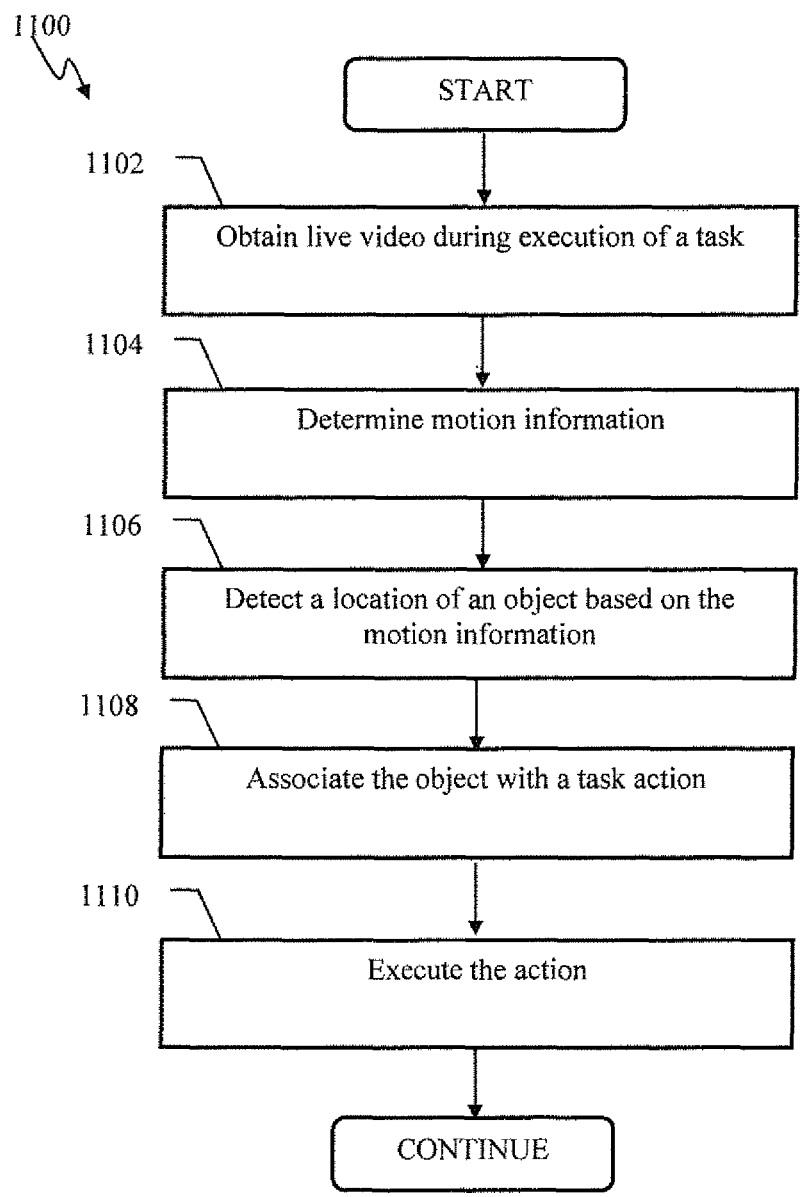
FIG. 11 is a logical flow diagram illustrating a method of data processing useful for determining features, in accordance with one or more implementations.

FIG. 11 illustrates a method of data processing useful for determining features, in accordance with one or more implementations.

At operation 1102 live video may be obtained during execution of a task. In some implementations of robotic vehicle navigation, the video may be obtained with a video camera disposed on the vehicle. The video stream may be encoded using any applicable standard comprising motion estimation operation (e.g., H.263, H.264, and/or other).

At operation 1104 motion information may be determined from the encoded video stream. In some implementations, the encoded video stream may be parsed in order to obtain motion information. In some implementations, the motion information may comprise a plurality of motion vectors and their locations as associated with one or more macroblocks within the encoded frame (e.g., the vector 916 of macroblock 914 in FIG. 9A).

At operation 1106 a location of an object within video frame may be determined using motion information obtained at operation 1104. In one or more implementations, the location determination may be based on temporal and/or spatial persistence (coherence) of motion over a given area and/or over several frames. By way of an illustration, occurrence of a plurality of macroblocks characterized by motion vectors within a given margin from one another (e.g., 5-20% in one implementation) in a given frame may indicate a moving object.

At operation 1108 the object associated with the location determined at operation 806 may be related to a task action. Based on the action determination, a control signal may be provided. In some implementations, the control signal provision may be configured based on operation of an adaptive predictor, e.g., such as described in U.S. patent application Ser. No. 13/842,530, entitled "ADAPTIVE PREDICTOR APPARATUS AND METHODS", filed on Mar. 15, 2013, incorporated supra.

At operation 1110, the action may be executed. By way of an illustration, the object may comprise a ball 174 in FIG. 1A, the motion information may indicate the ball moving to the left of the vehicle, the task may comprise target pursuit, and the action may comprise a left turn by the vehicle.

Figure 12:
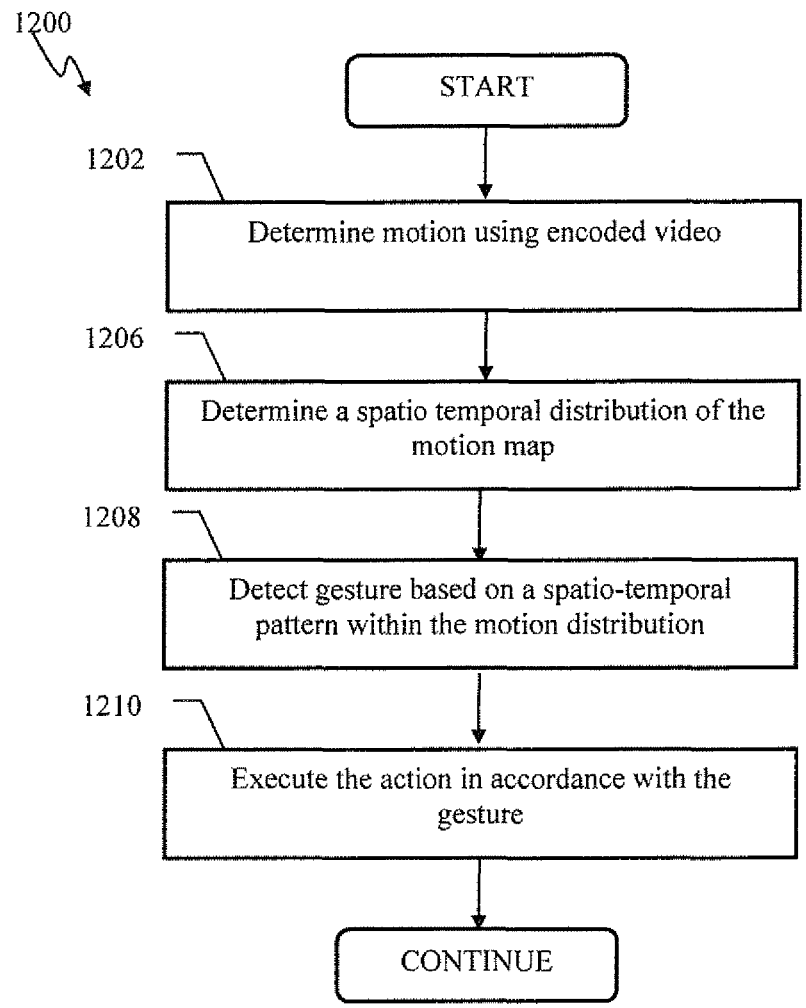
FIG. 12 is a logical flow diagram illustrating a method of executing an action configured based on a gesture detected using motion information, in accordance with one or more implementations.

FIG. 12 is a logical flow diagram illustrating a method of executing an action configured based on a gesture detected using motion information, in accordance with one or more implementations.

At operation 1202 motion information may be determined using one or more encoded video frames. In some implementations, the motion information may comprise motion vectors due to gestures of a human (e.g., vectors 936, 946 in FIG. 9B).

At operation 1204 a spatio-temporal distribution of the motion information may be determined. In some implementations of spatial motion distribution, the motion map may comprise more areas of macroblocks (e.g., the area 910 in FIG. 9A and/or 90 in FIG. 9C) characterized by similar motion vector components. (e.g., components of vector 946 in FIG. 9C). In some implementations, temporal motion distribution may be determined by analyzing motion associated with a portion of the frame (e.g., the area 940 in FIG. 9C) over a plurality of consecutive frames.

At operation 1206 a gesture may be determined based on a spatio-temporal pattern within the motion distribution. By way of an illustration, a pattern of alternating motion vectors of a rectangular area within the frame may correspond to a crisscross motion of arms by the user indicating an alert (e.g., a stop) command to the robotic device. In some implementations, motion information for a given frame may be characterized by a plurality of different motion vectors due to, e.g., motion of different objects, camera pan/zoom operation, and/or video acquisition from a moving platform. By way of an illustration of operation of the robotic vehicle 160 of FIG. 1B, video signal obtained by the camera 166 may comprise a representation of human making gestures superimposed on a moving background.

At operation 1208, an action may be executed in accordance with the gesture determined at operation 1206. For example, upon detecting the crisscross arm motion the robotic device may stop trajectory navigation.

The motion-based gesture detection methodology described herein may be employed for operation of a robotic appliance and/or remotely operated device. In some implementations, gesture detection may be effectuated by a spoofing controller, e.g., such as described in U.S. patent application Ser. No. 14/244,892, entitled "SPOOFING REMOTE CONTROL APPARATUS AND METHODS", filed on Apr. 3, 2014, incorporated herein by reference in its entirety. The spoofing controller may be trained to develop associations between the detected gestures and one or more remote control commands (by e.g., an IR remote operating a home appliance (TV)). The developed associations may enable the spoofing controller to operate the TV in accordance with gestured of a user in lieu of the remote controller commands.

A commercially available off-the shelf hardware video encoder (e.g., 1006 in FIG. 10) may be used to provide a compressed video stream. Typically, hardware encoders may be utilized in order to reduce video data rate in order to reduce storage, and/or bandwidth load associated with manipulation of video information. Motion extraction methodology described herein may advantageously enable determination of motion information by an application device using available compressed video albeit that is used for other purposes (e.g., reduction in storage and/or bandwidth). Use of available compressed video, comprising motion estimation data (e.g., MPEG-4) may substantially reduce computational load associated with motion determination, compared to existing techniques such as optic flow, and/or motion estimation algorithms such as but not limited to: block-matching algorithm, phase correlation, as well as determining locations of features and estimating the motion of those features.

Figure 13:
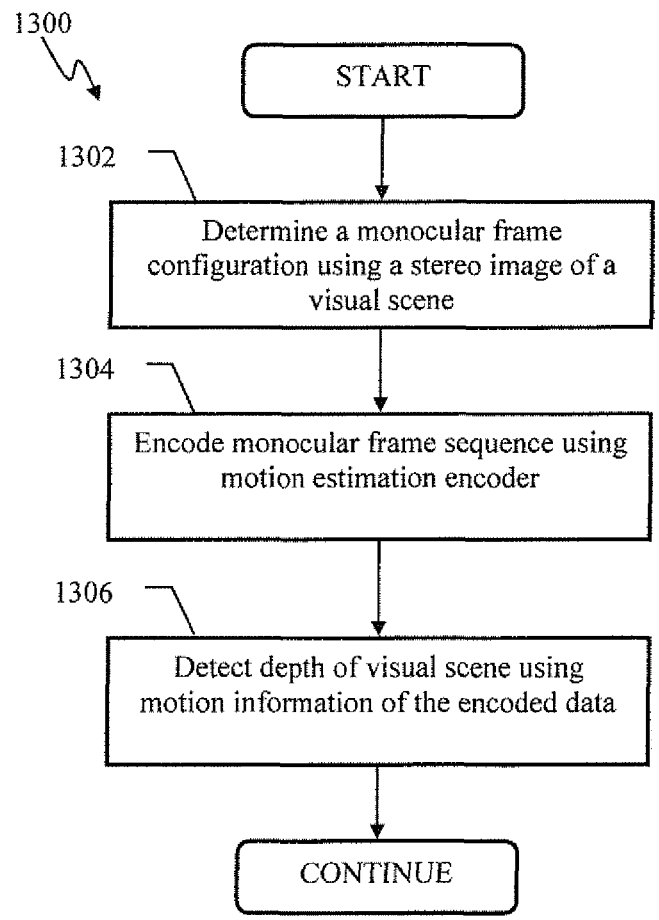
FIG. 13 is a logical flow diagram illustrating a method of determining a depth of visual scene using encoded interleaved stereo image information, in accordance with one or more implementations.

FIG. 13 illustrates a method of determining a depth of visual scene using encoded interleaved stereo image information, in accordance with one or more implementations.

At operation 1302 of method 1300, a monocular frame configuration may be obtained using a stereo image of a visual scene. In some implementations, the monocular frame configuration may comprise an interleaved frame sequence 324, 342 described above with respect to FIGS. 3A-3B. In one or more implementations of multi-camera image acquisition, the monocular frame configuration may comprise an interleaved frame sequence such as shown in FIGS. 6A and/or 6B.

At operation 1304 monocular frame sequence may be encoded using a motion estimation encoder. In some implementations, the encoding may be performed by a specialized video encoder comprising a motion estimation operation (e.g., MPEG-4, H.264, or other).

At operation 1306 depth of visual scene may be determined using motion information of the encoded data obtained at operation 1304. In one or more implementations, the motion information may be obtained by to parsing the compressed video stream (e.g., 422 in FIG. 4A). By way of an illustration, the motion information may comprise a macroblock location L (e.g., index), x-component, and y-component of motion of pixels associated with the macroblock location L. The extracted motion information may be used for disparity and or distance determination. Various uses of the depth information may be contemplated such as, for example, object detection, object localization, distance estimation, trajectory planning, gesture detection, and/or other.

Figure 14:
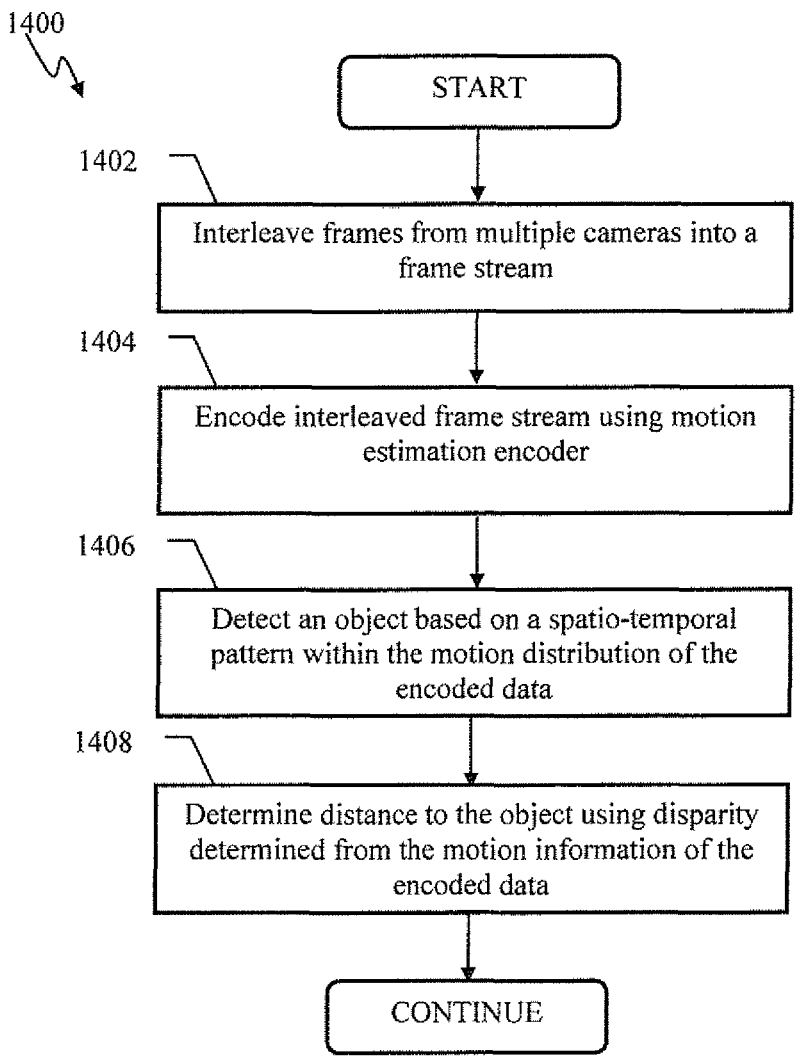
FIG. 14 is a logical flow diagram illustrating a method of determining distance to objects using motion of interleaved image stream, in accordance with one or more implementations.

FIG. 14 illustrates a method of determining distance to objects using motion of interleaved image stream, in accordance with one or more implementations.

At operation 1402 of method 1400, frames from multiple cameras may be combined into an interleaved frame stream. In one or more implementations the interleaved frame stream may comprise a frame sequence such as shown in FIGS. 6A and/or 6B.

At operation 1404 the interleaved frame sequence may be encoded using a motion estimation encoder. In some implementations, the encoding may be performed by a specialized video encoder comprising a motion estimation operation (e.g., MPEG-4, H.264, or other).

At operation 1406 an object may be detected based on a spatio-temporal pattern within the motion distribution of the encoded data. In one or more implementations, the motion information may be obtained by parsing the compressed video stream (e.g., 422 in FIG. 4A comprising, e.g., encoded frames 356, 360, 364 shown and described with respect to FIG. 3B). Object detection may be effectuated using any applicable methodologies including these described above with respect to FIGS. 9A-9C.

At operation 1408, distance to the object identified at operation 1406 may be determined. The distance determination may be configured based on the disparity data that may be obtained from the motion information of the encoded data (e.g., the frames 354, 358, 362 in FIG. 3B). Various uses of the distance information may be contemplated such as, for example, object detection, trajectory planning, gesture detection, obstacle avoidance, and/or other.

Figure 15:
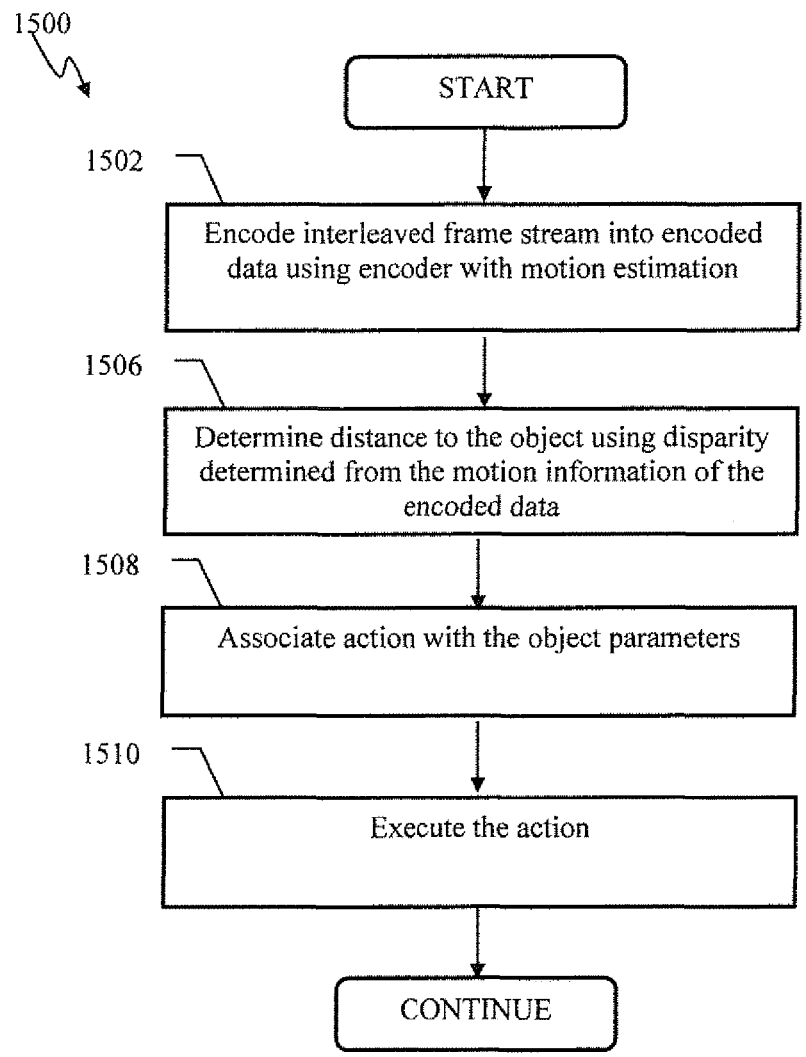
FIG. 15 is a logical flow diagram illustrating a method of executing an action configured based on detecting an object in motion information, in accordance with one or more implementations.

FIG. 15 illustrates a method of executing an action configured based on detecting an object in motion information, in accordance with one or more implementations.

At operation 1502 of method 1500 interleaved frame stream may be encoded using a motion estimation encoder. In some implementations, the encoding may be performed by a specialized video encoder comprising a motion estimation operation (e.g., MPEG-4, H.264, or other). into encoded data using encoder with motion estimation At operation 1506 distance to the object may be determined using disparity determined from the motion information of the encoded data. The distance determination may be configured based on the disparity data that may be obtained from the motion information of the encoded data (e.g., the frames 354, 358, 362 in FIG. 3B).

At operation 1508 an action may be associated with the object parameters determined at operation 1506. In some implementations, the object parameters may comprise object features (e.g., shape, color, identity), location, distance, speed, and/or other. By way of an illustration, the object may comprise a ball 112 in FIG. 1A rolling across the path of the vehicle 100. The distance to the ball 112 and the ball motion data may indicate that the vehicle 100 may collide with the ball 112. The action may comprise a turn left/right and/or reducing the speed of the vehicle 100.

At operation 1510 the action may be executed. Action execution may be configured based on output of an adaptive predictor apparatus configured to predict control signal for the robotic vehicle 100. In some implementations, the predictor may be operated in accordance with a learning process such as described, for example, in U.S. patent application Ser. No. 13/842,530, entitled "ADAPTIVE PREDICTOR APPARATUS AND METHODS", filed on Mar. 15, 2013, the foregoing being incorporated supra.

FIGS. 16A-16D illustrate gestures of a human operator used for communicating control indications to a robotic device comprising distance determination apparatus described herein, in accordance with one or more implementations.

FIG. 16A is a top view of a user and may illustrate a base posture of the user. FIG. 16B may depict user gestures 1600 communicating a right turn action to a robotic device (e.g., the vehicle 100 in FIG. 1A. The robotic device 100 may utilize stereo images provided by the cameras 106, 108 in order to detect position of the user arms 1608, 1608. In some implementations, the arm 1608, 1604 position may be determined using the distance determination methodology configured based on encoding interleaved left/right portions of the stereo imagery. By way of an illustration, the gesture in FIG. 16B may be determining based on a comparison of distance between the robot and the user arms in positions 1604, 1608 in FIG. 16B relative the user arms in position 1624 in FIG. 16A. In one or more implementations, the gesture in FIG. 16B may be determining based on a comparison of distance between the robot and the user arms in positions 1604, 1608 relative the user head 1602 in FIG. 16B.

FIG. 16C is a side view of the user and may depict user gesture 1610 communicating a stop action to a robotic device (e.g., the vehicle 100 in FIG. 1A). The robotic device 100 may utilize stereo images provided by the cameras 106, 108 in order to detect position of the user arms, head 1642, 1612, and for hands 1614, 1644. In some implementations, the hand 1642, 1644 position may be determined using the distance determination methodology configured based on encoding interleaved left/right portions of the stereo imagery. By way of an illustration, the gesture in FIG. 16C may be obtained based on a comparison of distance between the robot and the user hands in position 1614 in FIG. 16C relative the user hand in position 1644 in FIG. 16D. In one or more implementations, the gesture in FIG. 16C may be determined based on a comparison of distance between the robot and the user hand in position 1614 relative the user head 1612 in FIG. 16C. In some implementations (not shown) the user may communicate an indication to the robotic device by, e.g., appearing in view of the camera. By way of an illustrating, the user stepping in front of the vehicle may indicated to the vehicle a stop action The present disclosure also contemplates a computerized controller apparatus for implementing, inter alia, motion and/or distance determination methodology in accordance with one or more implementations.

The controller apparatus (not shown) may comprise a processing module configured to receive sensory input from sensory block (e.g., cameras 106, 108 in FIG. 1A). In some implementations, the sensory module may comprise audio input/output portion. The processing module may be configured to implement signal processing functionality (e.g., distance estimation, object detection based on motion maps, and/or other).

The controller apparatus may comprise memory configured to store executable instructions (e.g., operating system and/or application code, raw and/or processed data such as raw image frames and/or object views, teaching input, information related to one or more detected objects, and/or other information).

In some implementations, the processing module may interface with one or more of the mechanical, sensory, electrical, power components, communications interface, and/or other components via driver interfaces, software abstraction layers, and/or other interfacing techniques. Thus, additional processing and memory capacity may be used to support these processes. However, it will be appreciated that these components may be fully controlled by the processing module. The memory and processing capacity may aid in processing code management for the controller apparatus (e.g. loading, replacement, initial startup and/or other operations). Consistent with the present disclosure, the various components of the device may be remotely disposed from one another, and/or aggregated. For example, the instructions operating the haptic learning process may be executed on a server apparatus that may control the mechanical components via network or radio connection. In some implementations, multiple mechanical, sensory, electrical units, and/or other components may be controlled by a single robotic controller via network/radio connectivity.

The mechanical components of the controller apparatus may include virtually any type of device capable of motion and/or performance of a desired function or task. Examples of such devices may include one or more of motors, servos, pumps, hydraulics, pneumatics, stepper motors, rotational plates, micro-electro-mechanical devices (MEMS), electro-active polymers, shape memory alloy (SMA) activation, and/or other devices. The sensor devices may interface with the processing module, and/or enable physical interaction and/or manipulation of the device.

The sensory devices may enable the controller apparatus to accept stimulus from external entities. Examples of such external entities may include one or more of video, audio, haptic, capacitive, radio, vibrational, ultrasonic, infrared, motion, and temperature sensors radar, lidar and/or sonar, and/or other external entities. The module may implement logic configured to process user commands (e.g., gestures) and/or provide responses and/or acknowledgment to the user.

The electrical components may include virtually any electrical device for interaction and manipulation of the outside world. Examples of such electrical devices may include one or more of light/radiation generating devices (e.g. LEDs, IR sources, light bulbs, and/or other devices), audio devices, monitors/displays, switches, heaters, coolers, ultrasound transducers, lasers, and/or other electrical devices. These devices may enable a wide array of applications for the apparatus in industrial, hobbyist, building management, medical device, military/intelligence, and/or other fields.

The communications interface may include one or more connections to external computerized devices to allow for, inter alia, management of the controller apparatus. The connections may include one or more of the wireless or wireline interfaces discussed above, and may include customized or proprietary connections for specific applications. The communications interface may be configured to receive sensory input from an external camera, a user interface (e.g., a headset microphone, a button, a touchpad, and/or other user interface), and/or provide sensory output (e.g., voice commands to a headset, visual feedback, and/or other sensory output).

The power system may be tailored to the needs of the application of the device. For example, for a small hobbyist robot or aid device, a wireless power solution (e.g. battery, solar cell, inductive (contactless) power source, rectification, and/or other wireless power solution) may be appropriate. However, for building management applications, battery backup/direct wall power may be superior, in some implementations. In addition, in some implementations, the power system may be adaptable with respect to the training of the apparatus 1800. Thus, the controller apparatus may improve its efficiency (to include power consumption efficiency) through learned management techniques specifically tailored to the tasks performed by the controller apparatus.

Various aspects of the disclosure may advantageously be applied to design and operation of apparatus configured to process sensory data. Implementations of the principles of the disclosure may be applicable to detecting objects by a wide variety of stationary and portable video devices, such as, for example, smart phones, portable communication devices, notebook, netbook and tablet computers, surveillance camera systems, and practically any other computerized device configured to process vision data. The motion information may be used as a proxy for optic flow (estimated motion (dx,dy) on a grid across the frame of the video). Use of available hardware encoders to obtain motion data may reduce energy use by portable devices, enable motion detection on higher resolution video (e.g., resolutions greater than 320×240), improve motion detection resolution in order to, e.g., detect gestures, compared to optic flow detection techniques.

Interleaving of frames from multiple spatially displaced cameras may enable determination of binocular disparity between pairs of camera images using motion estimation. Use of an off-the shelf commercially available hardware video encoder (e.g., MPEG-4, H.265 and/or other encoder) comprising motion estimation, may substantially reduce cost, size, energy use of a motion estimation component, compared to use of optical flow for determining motion. Encoded into video may be parsed to obtain motion information. Motion corresponding to a pair of frames from displaced cameras may be interpreted as a measure of disparity. The disparity may be utilized in order to determine depth of visual scene and/or distance to objects within visual scene. By way of an illustration, embodying a motion determination component and/or a distance determination component of the disclosure in a robotic vehicle (e.g., 100, 1700 in FIGS. 1A, 17) may extend duration of autonomous operation of the robotic apparatus due to, in part, lower energy use that may be associated with motion/distance detection based on video encoded using hardware encoder, as compared to using video processing in a CPU (e.g., optical flow, and/or pixel block matching). The increased autonomy may be characterized by the robotic device capability to perform a given action (e.g., a flight route and/or surveillance route) an additional number of times without recharging, and/or being capable of completing longer routes on a given charge as compared to the prior art solutions. In one or more implementations, the reduced energy use may be leveraged for producing a smaller, lighter and/or less costly robot that may be capable of performing the action (e.g., navigate a given route) compared to the comparable device of the prior art.

An autonomous robotic device comprising a hardware video encoder may be capable to perform motion estimation for obstacle avoidance, tracking moving objects, stabilization, platform and/or enabling the robot to learn its own self motion. By way of an illustration, a robotic device may be configured to follow a target (e.g., a person, a ball 112 in FIG. 1A, and/other object) at a distance (e.g., 110 in FIG. 1A). In one or more implementations of tracking, the robotic device may be configured to maintain distance from target within a range (e.g., not to exceed 50 meters, and not to approach closer than 2 meters when following a for vehicle, and/or not to exceed 5 meters, and not to approach closer than 0.25 meters when following the ball 112 in FIG. 1A. In one or more implementations of object tracking, approach, avoid, and/or other, controller of the robotic device may be configured to determine distance to the target and motion of the target using, e.g., the alternating interleaving methodology shown and described with respect to FIG. 3B. In some implementations, the distance may be determined using the interleaving methodology; the motion may be determined using the video encoding methodology.

FIG. 17 illustrates use of distance determination methodology by an unmanned robotic apparatus configured for autonomous navigation, in accordance with one or more implementations. The unmanned autonomous vehicle (AUV) 1700 may comprise a plurality of cameras 1702 disposed spatially from one another. Video stream provided by the cameras 1702 may be interleaved and encoded using any applicable methodology described herein (e.g., with respect to FIGS. 3A-3B, 6A-6B, and/or 9A-9C). The encoding may enable controller of the vehicle 1700 (e.g., 400, 440 in FIGS. 4A-4B, and/or 700, 800 FIGS. 7-8) do determine distance 1706 between the vehicle 1700 and the landing location 1712, and/or distance 1718 to obstacles (e.g., 1710). The controller may utilize the distance and/or vehicle motion information to control actuators 1704 when landing, during take-off and or navigating around obstacles.

In some, implementations, the motion detection methodology described herein may be employed for detecting salient objects in video input. The saliency of an item (such as an object, a person, a pixel, and/or other) may be described by a characteristic by which the item may stand out relative to its neighbors. For example, a salient vehicle may comprise a vehicle that may be moving differently (e.g., going slower/faster than the rest of the traffic, weaving from lane to lane) compared to the rest of the traffic. A salient object for target approach may comprise a stationary and/or moving ball on a moving background due to self-motion by the vehicle.

Implementations of the principles of the disclosure may be further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

---

EXHIBIT I - EXEMPLARY COMPUTER CODE
©Copyright 2014 Brain Corporation. All rights reserved

```
void ff_h263_update_motion_val(MpegEncContext * s){
    const int mb_xy = s->mb_y * s->mb_stride + s->mb_x;
            //FIXME a lot of that is only needed for !low_delay
    const int wrap = s->b8_stride;
    const int xy = s->block_index[0];
    int motion_x=0, motion_y=0;
    const int block_size= 8>>s->avctx->lowres;
    s->current_picture.mbskip_table[mb_xy]= s->mb_skipped;
    if(s->mv_type != MV_TYPE_8X8){
        if (s->mb_intra) {
            motion_x = 0;
            motion_y = 0;
        } else if (s->mv_type == MV_TYPE_16X16) {
            motion_x = s->mv[0][0][0];
            motion_y = s->mv[0][0][1];
        } else /*if (s->mv_type == MV_TYPE_FIELD)*/ {
            int i;
            motion_x = s->mv[0][0][0] + s->mv[0][1][0];
            motion_y = s->mv[0][0][1] + s->mv[0][1][1];
            motion_x = (motion_x>>1) | (motion_x&1);
            for(i=0; i<2; i++){
                s->p_field_mv_table[i][0][mb_xy][0]= s->mv[0][i][0];
                s->p_field_mv_table[i][0][mb_xy][1]= s->mv[0][i][1];
            }
            s->current_picture.ref_index[0][4*mb_xy   ]=
            s->current_picture.ref_index[0][4*mb_xy + 1]= s->field_select[0][0];
            s->current_picture.ref_index[0][4*mb_xy + 2]=
            s->current_picture.ref_index[0][4*mb_xy + 3]= s->field_select[0][1];
        }
        /* no update if 8X8 because it has been done during parsing */
        s->current_picture.motion_val[0][xy][0] = motion_x;
        s->current_picture.motion_val[0][xy][1] = motion_y;
```

EXHIBIT I - EXEMPLARY COMPUTER CODE
©Copyright 2014 Brain Corporation. All rights reserved

```
            s->current_picture.motion_val[0][xy + 1][0] = motion_x;
            s->current_picture.motion_val[0][xy + 1][1] = motion_y;
            s->current_picture.motion_val[0][xy + wrap][0] = motion_x;
            s->current_picture.motion_val[0][xy + wrap][1] = motion_y;
            s->current_picture.motion_val[0][xy + 1 + wrap][0] = motion_x;
            s->current_picture.motion_val[0][xy + 1 + wrap][1] = motion_y;
            if(s->avctx->debug_mv) {
                for (int i=0;i<2*block_size;i++) memset(s->dest[0] + i * s->linesize, 120 + s-
>current_picture.key_frame * 5, 2*block_size);
                for (int i=0;i<block_size;i++) memset(s->dest[1] + i * s->uvlinesize, 128 + motion_x,
block_size);
                for (int i=0;i<block_size;i++) memset(s->dest[2] + i * s->uvlinesize, 128 + motion_y,
block_size);
            }
        } else {
            if(s->avctx->debug_mv) {
                for (int i=0;i<block_size*2;i++) memset(s->dest[0] + i * s->linesize, 130, block_size*2);
                for (int ywrap=0, y=0;y<2;ywrap+=wrap,y++) {
                    for (int x=0;x<2;x++) {
                        motion_x = s->current_picture.motion_val[0][xy + x + ywrap][0];
                        motion_y = s->current_picture.motion_val[0][xy + x + ywrap][1];
                        for (int i=0;i<block_size/2;i++) memset(s->dest[1] + x*block_size/2 + (i +
y*block_size/2) * s->uvlinesize, 128 + motion_x, block_size/2);
                        for (int i=0;i<block_size/2;i++) memset(s->dest[2] + x*block_size/2 + (i +
y*block_size/2) * s->uvlinesize, 128 + motion_y, block_size/2);
                    }
                }
            }
        }
        if(s->encoding){ //FIXME encoding MUST be cleaned up
            if (s->mv_type == MV_TYPE_8X8)
                s->current_picture.mb_type[mb_xy]= MB_TYPE_L0 | MB_TYPE_8x8;
            else if(s->mb_intra)
                s->current_picture.mb_type[mb_xy]= MB_TYPE_INTRA;
            else
                s->current_picture.mb_type[mb_xy]= MB_TYPE_L0 | MB_TYPE_16x16;
        }
}
```

What is claimed:

1. A method of determining distance to an object disposed within a visual scene, the method comprising:
producing a video stream by interleaving images of a first plurality of images and a second plurality of images of the visual scene, individual images of the first and second pluralities of images being provided by respective first and second cameras of a robot, the second camera being separated spatially from the first camera;
encoding a plurality of frames from the video stream, the encoded plurality of frames comprising (i) at least one frame encoded with disparity information corresponding to an image of the first plurality of images and an image of the second plurality of images, (ii) at least one frame encoded with motion information corresponding to the image of the second plurality of images and another image of the second plurality of images, and (iii) at least one empty frame that is void with respect to disparity and motion information;
evaluating the encoded plurality of frames to determine the distance to the object;
evaluating the encoded plurality of frames and the distance to the object to detect a spatio-temporal pattern of movement associated with at least the object; and
causing the robot to execute a physical action based on a command signal generated based on the spatio-temporal pattern associated with at least the object.

2. The method of claim 1, wherein:
the evaluating of the video stream comprises determining a binocular disparity between at least a portion of the second and the first pluralities of images, the binocular disparity being related to the distance and the spatial separation of the second camera from the first camera; and
the determination of the distance is based on the determining of the binocular disparity.

3. The method of claim 2, wherein the evaluating of the video stream further comprises:
encoding the video stream using an encoder process comprising motion estimation, the motion estimation configured to provide information related to a displacement of a first representation of the object within a given image of the video stream relative to a second representation of the object within a preceding image of the video stream.

4. The method of claim 3, wherein:
individual ones of the first and second pluralities of images comprise a plurality of pixels;
the encoder process is selected from the group consisting of MPEG-4, H.262, H.263, H.264, and H.265 encoders;
the first object representation comprises a first block of pixels of a plurality of pixels of the given image; and
the information related to the displacement is configured to relate a displacement of the first block of pixels relative to a second block of pixels.

5. The method of claim 4, wherein:
the given image comprises the image of the second plurality of images;

the preceding image comprises the image of the first plurality of images acquired contemporaneously with the given image; and horizontal and vertical dimensions (H×V) of the first block and the second block of pixels are set by the encoder process at one of (i) 8×8 pixels, and (i) 16×16 pixels.

6. The method of claim 3, wherein:
the preceding image comprises the image of the second plurality of images; and
the given image comprises the image of the first plurality of images acquired contemporaneously with the preceding image.

7. The method of claim 3, wherein:
a first image is selected from the first plurality of images;
a second image is selected from the second plurality of images;
the given image comprises the first image;
the preceding image comprises the second image; and
the given image is acquired subsequent to another image of the first plurality of images and prior to the another image of the second plurality of images, the another image of the first plurality of images preceding the second image, the second image preceding the another image within the second plurality of images.

8. A non-transitory computer-readable apparatus comprising a storage medium having instructions embodied thereon, the instructions being executable to produce a combined image stream from first and second sequences of images of a sensory scene by at least:
selecting a first image and a second image from the second sequence to follow a first image from the first sequence, the second image from the second sequence following the first image from the second sequence;
selecting second and third images from the first sequence to follow the second image from the second sequence, the third image from the first sequence following the second image from the first sequence;
interleaving the first, second and third images from the first sequence of images and the first and second images from the second sequence of images to produce the combined image stream;
evaluating the combined image stream to determine (i) a depth parameter of the scene, (ii) a first motion parameter associated with the first sequence of images, and (iii) a second motion parameter associated with the second sequence of images;
determining a distribution characterizing respective values of the first motion parameter associated with the first sequence of images and the second motion parameter associated with the second sequence of images; and
based on a portion of the distribution characterizing the respective values of the at least the first and second motion parameters, causing a robotic device to perform an action.

9. The computer readable apparatus of claim 8, wherein:
the first and the second image sequences of images are provided by a first and a second image sensor, respectively, the first image sensor being disposed spatially separated from the second image sensor;
the first image sensor and the second image sensor are configured to provide images of the sensory scene;
the spatial separation is configured to produce a binocular disparity for the first image from the second sequence relative the first image from the first sequence; and for the second image from the second sequence relative the second image from the first sequence; and
the depth is determined based on the disparity.

10. The computer readable apparatus of claim 9, wherein:
individual images of the first image sequence and the second image sequence comprise a plurality of pixels; and
the evaluating of the combined image stream comprises encoding the combined stream using a motion estimation encoder.

11. The computer readable storage apparatus of claim 10, wherein:
the combined image stream comprises the first image from the first sequence, followed by the first image from the second sequence followed by the second image from the second sequence followed by the second image from the first sequence followed by the third image from the first sequence; and
the motion estimation encoder is configured to:
determine a first version of the disparity based on encoding the first image from the first sequence and the first image from the second sequence;
determine a second version of the disparity based on encoding the second image from the second sequence and the second image from the first sequence, the second version of the disparity having an opposite sign relative to the first version;
determine a first motion of the second image sequence based on encoding the first image from the second sequence followed by the second image from the second sequence; and
determine a second motion of the first image sequence based on encoding the second image from the first sequence followed by the third image from the first sequence.

12. The computer readable storage apparatus of claim 11, wherein:
the first version and the second version of the disparity enable determination of a first version and a second version of the depth parameter; and
a combination of the first version and the second version of the depth parameter is configured to reduce an error associated with the determination of the depth parameter configured solely on the first version of the disparity or the second version of the disparity.

13. The computer readable storage apparatus of claim 12, wherein:
the scene comprises an object;
the depth parameter comprises a distance to the object;
the determination of the first version and the second version of the disparity is configured to effectuate the determination of the depth parameter in presence of an occlusion in a view field of at least one camera of a first, second or third camera, the occlusion at least partly obscuring the object.

14. The computer readable storage apparatus of claim 12, wherein:
the third image from the first sequence is followed by a third image from the second sequence in the combined image stream;
the motion estimation encoder is further configured to determine a third version of the disparity based on encoding the third image from the first sequence followed by the third image from the second sequence, the third version of the disparity having an opposite sign relative the second version;

individual ones the first image sensor and the second image sensor comprise a video camera;

the third version of the disparity enables determination of a third version the depth parameter; and another combination configured based on two or more of the first version, the second version, and the third version of the depth parameter is configured to reduce an error associated with the determination of the depth parameter configured solely on the first version of the disparity.

15. The computer readable storage apparatus of claim 12, wherein:

individual ones the first image sensor and the second image sensor comprise any of a radio frequency wave sensor, infrared sensor and pressure wave sensor;

the scene comprises an object; and the depth parameter comprises a distance to the object.

16. The computer readable storage apparatus of claim 8, wherein:

the first and the second image sequences of images are provided by a first and a second image sensor, respectively, the first image sensor being disposed spatially separated from the second image sensor; and the first image sensor and the second image sensor are configured to each provide images of the sensory scene.

17. An image processing apparatus, comprising:

an input interface configured to receive a stereo image of a visual scene, the stereo image comprising a first frame and a second frame;

a logic component configured to form a sequence of frames by arranging the first and the second frames sequentially with one another within the sequence;

a video encoder component in data communication with the logic component and configured to encode the sequence of frames to produce a sequence of compressed frames; and a processing component in data communication with the video encoder and configured to obtain motion information associated with the visual scene based on an evaluation of the compressed frames;

wherein at least some of the compressed frames comprise the motion information associated with the visual scene, the motion information associated with the visual scene comprising one or more displacements with respect to the first and the second frames; and wherein the processing component is further configured to, based on an evaluation of the motion information associated with the visual scene, obtain a depth parameter of a salient object within the visual scene which was not previously detected within the stereo image of the visual scene, obtain motion information associated with said salient object, and cause execution of a robotic command based on the obtained depth parameter of said salient object and the obtained motion information associated with said salient object.

18. The apparatus of claim 17, wherein:

the sequence of compressed frames comprises a key frame characterized by absence of the motion information; and the processing component is configured to not utilize the key frame during the evaluation of the compressed frames.

19. The apparatus of claim 17, wherein the obtainment of the depth parameter comprises a determination, based on the evaluation of the motion information, of a distance to the object associated with the visual scene.

20. The apparatus of claim 19, wherein:

the input interface is further configured to receive another image comprising a third frame, the first, second and third frames being provided respectively by first, second, and third cameras disposed spatially separately from one another; and the logic component is further configured to form the sequence of frames by arranging the third frame sequentially with the first frame and the second frame.

21. The apparatus of claim 19, wherein:

the input interface is further configured to receive another image comprising a third frame and a fourth frame, the first, second, third, and fourth frames being provided respectively by first, second, third, and fourth cameras disposed spatially separately from one another; and the logic component is further configured to form the sequence of frames by arranging the third frame sequentially with the first and the second frame.

22. The apparatus of claim 21, wherein:

the first, the second, the third, and the fourth cameras are disposed in a linear array characterized by a first spatial camera separation and a second spatial camera separation, the second camera separation being greater than the first camera separation;

the evaluation of the compressed frames is configured to provide a first estimate of the depth corresponding to the first spatial camera separation and a second estimate of the depth corresponding to the second spatial camera separation; and the second estimate being characterized by a greater precision as compared to the first estimate.

23. The apparatus of claim 21, wherein the encoder is configurable to produce the sequence of compressed frames at least at a frame rate selected between 1 and 100 frames per second; and the apparatus is adapted to be embedded in an integrated circuit.

* * * * *